(12) United States Patent
Walker et al.

(10) Patent No.: US 8,781,889 B2
(45) Date of Patent: *Jul. 15, 2014

(54) SYSTEM FOR PROVIDING OFFERS USING A BILLING STATEMENT

(75) Inventors: Jay S. Walker, Ridgefield, CT (US);
James P. Jorasch, New York, NY (US);
Daniel E. Tedesco, Huntington, CT (US); Stephen C. Tulley, Monroe, CT (US); Timothy A. Palmer, Burbank, CA (US); Russell P. Sammon, San Francisco, CA (US); John M. Packes, Hawthorne, NY (US); Geoffrey M. Gelman, Brooklyn, NY (US); Kurt M. Maschoff, Darien, CT (US); Andrew P. Golden, Jamaica Plain, MA (US); Michiko Koabayashi, Stamford, CT (US)

(73) Assignee: Ebay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,532

(22) Filed: Sep. 20, 2011
(Under 37 CFR 1.47)

(65) Prior Publication Data
US 2012/0010934 A1    Jan. 12, 2012

Related U.S. Application Data

(60) Continuation of application No. 12/130,126, filed on May 30, 2008, which is a division of application No. 11/456,393, filed on Jul. 10, 2006, now abandoned, which is a continuation of application No. 09/855,300, filed on May 15, 2001, now abandoned, and a continuation-in-part of application No. 09/100,684, filed on Jun. 19, 1998, now Pat. No. 6,898,570, and a continuation-in-part of application No. 08/994,426, filed on Dec. 19, 1997, now Pat. No. 6,694,300, and a continuation-in-part of application No. 08/982,149, filed on Dec. 1, 1997, now Pat. No. 6,196,458.

(60) Provisional application No. 60/204,330, filed on May 15, 2000.

(51) Int. Cl.
*G06Q 30/00* (2012.01)

(52) U.S. Cl.
USPC .......... 705/14.1; 705/14.16; 705/40; 235/375

(58) Field of Classification Search
USPC ................. 705/14.1, 14.16, 40; 235/375
See application file for complete search history.

(56) References Cited

U.S. PATENT DOCUMENTS 5,537,314 A * 7/1996 Kanter ................... 705/14.13
5,905,245 A * 5/1999 Tanaka ..................... 235/375
5,905,246 A * 5/1999 Fajkowski ................ 235/375

FOREIGN PATENT DOCUMENTS

JP     5-257950    * 10/1993
JP    10-187318    *  7/1998

OTHER PUBLICATIONS

McClain, Timothy J., "Entrepreneur builds a leading-edge company and Web payment system around his vision of the right way to do Interenet marketing", Jul. 1997, San Diego Metropolitan Magazine, Cover Story, pp. 1-8.*

(Continued)

*Primary Examiner* — John Van Bramer
(74) *Attorney, Agent, or Firm* — Haynes and Boone, LLP

(57) ABSTRACT

A billing statement according to one aspect of the invention includes a description of a transaction and an offer pointer associated with the transaction, wherein the offer pointer includes information that may be used to review an offer. In one example of this aspect, a telephone number or a hyperlink is provided adjacent to a total amount owed listed on a statement (e.g., an electronically-displayed billing statement). The offers reviewed may be customized, for example, based on details of the transaction such as the product purchased or the amount of the purchase, the identity of the consumer, and/or on other data.

22 Claims, 18 Drawing Sheets

(56) References Cited

OTHER PUBLICATIONS

Duffy, "Customer loyalty strategies", 1998, The Journal of Consumer Marketing, Santa Barbara: vol. 15, Issue 5, p. 435.*

McClain, Timothy J., Entrepreneur builds a leading-edge company and Web payment system around his vision of the right way to do Internet marketing, Jul. 1997, San Diego Metropolitan Magazine, Cover Story, pp. 1-8.*

Duffy, "Customer loyalty strategies", 1998, The Journal of Consumer Marketing, Santa Barbara: vol. 15, Issue 5, pp. 435.*

Chen, Paying Customers to Switch, Journal of Economics & Management Strategy, vol. 6, Issue 4, pp. 877-897, Winter 1997.*

* cited by examiner

FIRST BANK OF ANYWHERE

MR. FRANK WRIGHT
333 BLUE AVENUE
THEREABOUTS, NY 01333

ACCOUNT NO. 5555-6666-7777-8888

| TRANSACTION DATE | DESCRIPTION | AMOUNT OWED | ALTERNATIVE PAYMENT INFORMATION |
|---|---|---|---|
| 3/12/2003 | JACK'S DIME STORE -TOOTHBRUSH | $1.10 | HTTP://WWW.NEEDNOTPAY.COM/SMALLCHARGE/1.HTM |
| 3/17/2003 | KIM'S AUTO REPAIR -TRANSMISSION REPAIR | $160.00 | HTTP://WWW.NEEDNOTPAY.COM/BIGCHARGE/CODE=X847Q |
| 3/17/2003 | ELECTRONICS WORLD -27" TELEVISION | $350.00 | 1-800-ERASEIT, CODE: 5MP6Z |
| 3/17/2003 | BILL'S GAS -7.5 GALLONS 89 OCTANE | $10.00 | 1800-555-1212 X256 |
| 3/19/2003 | SUE'S SPORTS -BASKETBALL | $25.00 | I AGREE TO CHANGE MY LONG DISTANCE PROVIDER TO NCI ☐ |

CURRENT CHARGES $546.10

PREVIOUS CHARGES OWED $123.50

FINANCE CHARGE $1.75

TOTAL AMOUNT OWED $671.35

MINIMUM DUE: $30.00
DUE DATE: 4/30/2003

I AGREE TO REGISTER FOR 1 YEAR OF BOL INTERNET ACCESS ☐

MODIFIED TOTAL AMOUNT OWED:_____
MODIFIED MINIMUM DUE:_____
MODIFIED DUE DATE:_____

FIG. 1

| CONSUMER IDENTIFIER 161 | NAME 162 | ADDRESS 163 | CREDIT CARD ACCOUNT NUMBER 164 |
|---|---|---|---|
| 111111B | ANTHONY WILLIAMS | 111 RED ST. ANYWHERE, NY 01111 | 4444-3333-2222-1111 |
| 222222B | MARY SMITH | 222 WHITE RD. SOMEWHERE, NY 01222 | 1111-2222-3333-4444 |
| 333333B | FRANK WRIGHT | 333 BLUE AVE. THEREABOUTS, NY 01333 | 5555-6666-7777-8888 |

| AMOUNT OWED BY CONSUMER 165 | MINIMUM AMOUNT DUE 166 | DUE DATE 167 | AMOUNT OWED BY CONTROLLER 168 |
|---|---|---|---|
| $34.01 | $15.00 | 9/15/03 | $29.95 |
| $198.76 | $25.00 | 9/18/03 | $40.00 |
| $328.99 | $30.00 | 9/09/03 | $0.00 |

FIG. 7

| TRANSACTION IDENTIFIER 171 | CREDIT CARD ACCOUNT NUMBER 172 | TRANSACTION DESCRIPTION 173 | TRANSACTION DATE 174 | AMOUNT DUE 175 | MERCHANT IDENTIFIER 176 |
|---|---|---|---|---|---|
| 333333T | 4444-3333-2222-1111 | MOM'S HOTEL, TWO NIGHTS | 4/8/2003 | $126.54 | 5555M |
| 444444T | 1111-2222-3333-4444 | BIG SAM'S FITNESS MEMBERSHIP | 4/12/2003 | $150.00 | 6666M |
| 555555T | 5555-6666-7777-8888 | JACK'S DIME STORE TOOTHBRUSH | 3/29/2003 | $1.10 | 7777M |

| RULE IDENTIFIER 241 | AMOUNT OWED RANGE 242 | TRANSACTION CATEGORY 243 | MERCHANT 244 | ALTERNATIVE PAYMENT INFORMATION 245 |
|---|---|---|---|---|
| 222R | $30 - $45 | ANY | ANY | I AGREE TO REGISTER FOR 1 YEAR OF BOL INTERNET ACCESS ☐ |
| 333R | ANY | ANY | ANY | HTTP://WWW.ERASECHARGES.COM/ AMOUNTOWED=[INSERTAMOUNTOWED] |
| 444R | $50 - $100 | ANY | SHOE SOURCE | 1-800-555-1212 X256 |
| 555R | $15 - $25 | ANY | ANY | I AGREE TO CHANGE MY LONG DISTANCE PROVIDER TO NCI ☐ |
| 666R | $0 - $10 | ANY | ANY | HTTP://WWW.NEEDNOTPAY.COM/ SMALLCHARGE/1.HTM |
| 777R | $0 - $40 | SPORTING OR RECREATION | THE LEISURE PLANET | HTTP://WWW.NEEDNOTPAY.COM/ SMALLCHARGE/LEISUREPLANET |
| 888R | ANY | COSMETICS | ANY | HTTP://WWW.DONTPAY.COM/ANY/ COSMETICS.HTM |
| 999R | $50 - $100 | ANY | ANY | 1-800-ERASEIT |

| OFFER IDENTIFIER 251 | SUBSIDIZING MERCHANT IDENTIFIER 252 | BENEFIT 253 | OBLIGATION 254 | OFFER RULES 255 |
|---|---|---|---|---|
| 999333O | 7676S | $40 | CUSTOMER MUST SWITCH TO NCI WITHIN 30 DAYS OF ACCEPTING THE OFFER | ALWAYS DISPLAY ON THE MEDIUM CHARGE WEB PAGE |
| 777666O | 9292S | AMOUNT OWED UP TO $50 | CONSUMER MUST MAKE A MINIMUM OF $50 PURCHASE AT MAX 6TH AVENUE WITHIN 14 DAYS OF ACCEPTING THE OFFER | TRANSMIT IF THE ASSOCIATED TRANSACTION WAS A DEPARTMENT STORE PURCHASE |

| CONSUMER IDENTIFIER 261 | NAME 262 | CREDIT CARD ACCOUNT NUMBER(S) 263 | ACCEPTANCE PERCENTAGE 264 | FRAUD FLAG 265 |
|---|---|---|---|---|
| 121212C | ADAM THOMAS | 4545-4545-4545-4545 6767-6767-6767-6767 | 7% | NO |
| 343434C | CINDY JONES | 9898-9898-9898-9898 | 20% | NO |

| SUBSIDIZING MERCHANT IDENTIFIER 271 | SUBSIDIZING MERCHANT NAME/ DESCRIPTION 272 | REMAINING BUDGET 273 | AMOUNT OWED BY MERCHANT 274 |
|---|---|---|---|
| 9999S | MIMI'S DRY CLEANING/ DRY CLEANING | $3000 | $1800 |
| 1234S | BRIDGEWATER TELEPHONE/ LONG DISTANCE PROVIDER | $500 OFFERS | $0 |
| 8484S | BOL/INTERNET ACCESS PROVIDER | $2450 | $550 |

| BANK IDENTIFIER 291 | BANK NAME 292 | AMOUNT OWED TO BANK 293 |
|---|---|---|
| 9871 | FIRST BANK OF ANYWHERE | $12,000 |
| 8761 | SAVINGS BANK OF SOMEPLACE | $23,907 |

| SUBSIDY OFFER IDENTIFIER 382 | BENEFIT 384 | OBLIGATION 386 | OFFER RULES 388 |
|---|---|---|---|
| 112233SO | $20 | CONSUMER MUST REGISTER FOR "FRIENDS AND RELATIVES" CALLING PLAN | CONSUMER MUST BE EXISTING NCI CUSTOMER AND NOT REGISTERED WITH "FRIENDS AND RELATIVES" CALLING PLAN |
| 445566SO | $40 | CONSUMER MUST SWITCH TO NCI WITHIN 30 DAYS OF ACCEPTING THE OFFER | ALWAYS DISPLAY ON MEDIUM CHARGE WEB PAGE |
| 778899SO | $100 | CONSUMER MUST REGISTER FOR 2 YEARS OF NCI INTERNET ACCESS | ASSOCIATE WITH PURCHASE OF PERSONAL COMPUTER |

SYSTEM FOR PROVIDING OFFERS USING A BILLING STATEMENT

CROSS-REFERENCE TO RELATED APPLICATIONS

This application is a continuation of U.S. patent application Ser. No. 12/130,126 filed May 30, 2008, for "SYSTEM FOR PROVIDING OFFERS USING A BILLING STATEMENT"; which is a divisional of U.S. patent application Ser. No. 11/456,393 filed on Jul. 10, 2006 and now abandoned; which is a continuation of U.S. patent application Ser. No. 09/855,300, filed May 15, 2001 and now abandoned; which:
  (i) claims the benefit of U.S. Patent Application No. 60/204,330, filed May 15, 2000, for "COST AVOIDANCE ON CREDIT CARD STATEMENTS"; and
  (ii) is a Continuation-in-Part of U.S. patent application Ser. No. 09/100,684, filed Jun. 19, 1998, for "BILLING STATEMENT CUSTOMER ACQUISITION SYSTEM", which issued as U.S. Pat. No. 6,898,570 on May 24, 2005; and
  (iii) is a Continuation-in-Part of U.S. patent application Ser. No. 08/994,426, filed Dec. 19, 1997, for "METHOD AND APPARATUS FOR PROVIDING SUPPLEMENTARY PRODUCT SALES TO A CUSTOMER AT A CUSTOMER TERMINAL" which issued as U.S. Pat. No. 6,694,300 on Feb. 17, 2004; and
  (iv) is a Continuation-in-Part of U.S. patent application Ser. No. 08/982,149, filed Dec. 1, 1997, for "METHOD AND APPARATUS FOR PRINTING A BILLING STATEMENT TO PROVIDE SUPPLEMENTARY PRODUCT SALES", which issued as U.S. Pat. No. 6,196,458 on Mar. 6, 2001.

Each of the above-referenced applications is incorporated by reference herein in its entirety.

BACKGROUND OF THE INVENTION

1. Field of the Invention

The present invention relates to systems for providing offers to consumers. More particularly, the present invention concerns systems for providing offers to consumers using billing statements.

2. Description of the Related Art

Sellers present offers to consumers in order to sell products and to acquire new customers. For example, a retailer may use newspaper advertisements or mass mailings to offer products to consumers for sale prices. In another example, a representative of a long distance telephone service provider may call a consumer and offer cash in exchange for the consumer's agreement to use the provider's service. Other conventional channels for presenting offers include radio and television advertisements, billboards, and in-store displays.

However, since a typical consumer is inundated with offers received through conventional channels, such offers are rather limited in their ability to receive the consumer's thorough consideration. Moreover, of all the offers presented to the consumer, only a small fraction actually deal with products and/or services in which the consumer is interested. As a result of these factors, most offers presented to consumers through conventional channels are virtually ignored.

Some sellers, realizing that only a small fraction of presented offers will be considered and even a smaller fraction will actually be accepted, try to increase a total number of accepted offers by increasing the total number of offers presented to consumers. This strategy is not acceptable to most sellers because it suffers from the problems described above with respect to offers presented through conventional channels and because it can be quite costly. Additionally, since this strategy results in an increase in the number of offers presented through conventional channels, the already small fraction of these offers which are effectively considered tends to decrease.

In an attempt to address the foregoing, some sellers have employed billing statements as vehicles for presenting offers to consumers. For example, Synapse Group, Inc. of Stamford, Conn. presents offers for magazine subscriptions using materials enclosed with monthly credit card billing statements. This approach presumes that a consumer will pay more attention to items received along with a billing statement than to advertising vehicles such as mass mailings or newspaper advertisements. As a result, it is believed that the approach increases the percentage of offers which are thoroughly considered by consumers.

One shortcoming of the previous approach results from the limited space available for including advertising materials within billing statements. Due to this limitation, offers which can be presented using this approach are limited to a small number of concise, simply explained offers. Accordingly, what is needed is a system allowing sellers to present more offers and additional types of offers, including complex, customized, and dynamically-created offers, to consumers using billing statements.

Moreover, offers presented using billing statements as described above are no more likely than other conventional offers to deal with products or services in which a particular consumer is interested. As a result, such offers are no more likely than conventional offers to be accepted even if thoroughly considered. Therefore, what is also needed is a system providing consumers with increased incentive to accept offers presented using billing statements.

SUMMARY OF THE INVENTION

In order to address the foregoing, the present invention, according to one embodiment, concerns a billing statement including a description of a transaction and an offer pointer associated with the transaction, wherein the offer pointer includes information that may be used to review an offer.

BRIEF DESCRIPTION OF THE DRAWINGS

FIG. 1 is a view of a billing statement according to one embodiment of the present invention;

FIG. 7 is a tabular representation of a portion of a consumer account database according to one embodiment of the present invention;

FIG. 8 is a tabular representation of a portion of a transaction database according to one embodiment of the present invention;

FIG. 9 is a tabular representation of a portion of a rules database according to one embodiment of the present invention;

FIG. 10 is a tabular representation of a portion of an offer database according to one embodiment of the present invention;

FIG. 11 is a tabular representation of a portion of a central consumer database according to one embodiment of the present invention;

FIG. 12 is a tabular representation of a portion of a subsidizing merchant database according to one embodiment of the present invention;

FIG. 14 is a tabular representation of a portion of an issuing bank database according to one embodiment of the present invention;

FIG. 16 is a tabular representation of a portion of a subsidy offer database according to one embodiment of the present invention;

DETAILED DESCRIPTION

Figure 2:
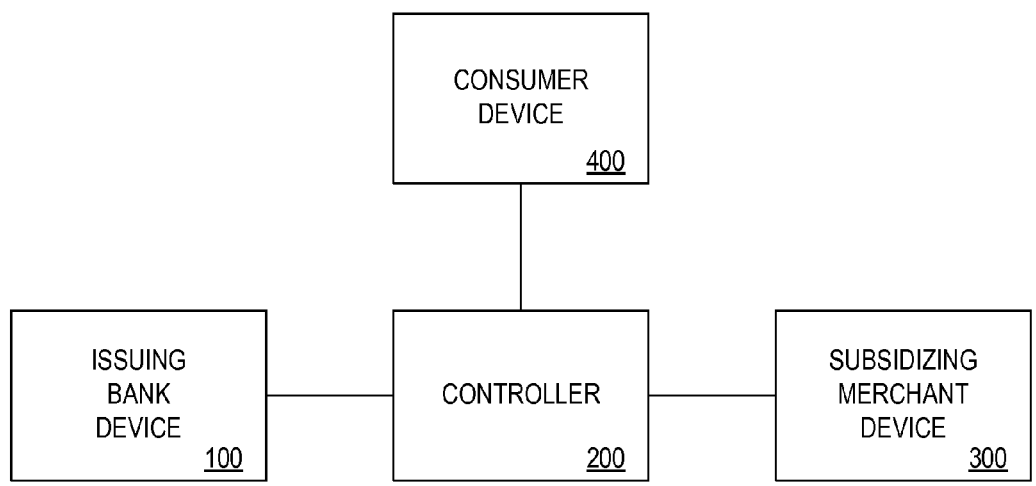
FIG. 2 is a block diagram of a system architecture according to one embodiment of the present invention.

Various embodiments of the present invention comprise a billing statement including a description of a transaction and an offer pointer associated with the transaction, wherein the offer pointer includes information that may be used to review an offer. According to one example of the present invention, the offer pointer is a toll-free telephone number printed adjacent to a description of a transaction on a credit card billing statement. The telephone number accesses a voice response (VR) system presenting conditional branches through which a consumer can navigate to review an offer. In another example, a hyperlink is positioned adjacent to a total amount owed listed on an electronically-displayed billing statement. The hyperlink may be selected to access a website presenting offers for review by the consumer. The offers reviewed in each of these examples may be customized based on details of the transaction such as the product purchased, the amount of the purchase, the identity of the consumer, and/or on other information.

If, in accordance with various embodiments of the present invention, an offer pointer is included in a billing statement, it is likely that the reviewed offer will be more thoroughly considered than a conventional offer. Moreover, the complexity of the offer and the number of offers may not be limited by space constraints imposed by the billing statement. The offer may also be generated so as to be tailored to the characteristics or needs of the consumer, the seller, or a third party. As a result, the offer may be more likely to be accepted than an offer presented using conventional methods.

In various embodiments of the present invention, the reviewed offer, if accepted, reduces an amount owed which is associated with the transaction. For example, the reviewed offer may specify that the consumer's account balance will be reduced by the amount owed as a result of the transaction in exchange for performance of an obligation. This further aspect provides incentive to a consumer to accept the reviewed offer, since the acceptance would allow the consumer to avoid a previously-incurred cost. This incentive is particularly strong if the consumer regrets the transaction to which the offer is associated. In addition, this aspect allows billing companies, such as credit card issuers, to reduce uncollectable debt by allowing consumers to reduce their outstanding account balances through accepted offers.

According to various embodiments, the present invention concerns a billing statement including a description of a transaction and an offer associated with the transaction, wherein the offer is to reduce an amount owed associated with the transaction. As an example of this aspect, a billing statement for a credit card account includes a description of a purchase of gasoline and an amount owed by the consumer as a result of the purchase. Printed adjacent to the amount is text which indicates that the amount will be deducted from the account if the consumer agrees to switch long distance telephone service providers. In a further example, several transactions described in a billing statement may each be associated with different offers to reduce amounts owed associated with each respective transaction. Advantageously, these various embodiments allow the consumer to avoid a previously-incurred cost, and may reduce a creditor's uncollected debt by providing an alternative system for consumers to reduce their outstanding balances.

In various embodiments, the present invention relates to a system in which: transaction information is received; an offer pointer is determined based on the transaction information, the offer pointer including information that may be used to review an offer; and the offer pointer is transmitted to a consumer via a billing statement. Since the offer pointer is determined based on received transaction information, the offer which may be reviewed using the offer pointer may be particularly suited to the transaction information. In one particular example, the received transaction information indicates that a tennis racket was purchased, therefore the determined offer pointer is a World Wide Web address of a tennis supply website presenting offers for other tennis equipment. Advantageously, these various embodiments may increase the likelihood that the reviewed offer is accepted.

In various embodiments, the present invention is a system in which: transaction information is received; an offer is determined based on the transaction information; an offer pointer is determined, the offer pointer including information that may be used to review the offer; and the offer pointer is transmitted to a consumer via a billing statement. According to these various embodiments, the offer is determined based on received transaction information; therefore, the offer itself may be particularly suited to the transaction information. Such an arrangement may thereby increase the likelihood that the offer is accepted.

In various embodiments, the present invention concerns a system in which a request is received from a consumer to review an offer associated with a transaction on a billing statement, the offer being an offer to reduce an amount owed by the consumer. The offer is transmitted to the consumer and a new amount owed is calculated if the offer is accepted by the consumer. These various embodiments allow a consumer to avoid overpayment or underpayment of an amount owed by updating the amount owed based on an accepted offer. In other various embodiments, a new minimum payment is also determined if the offer is accepted. This feature conveniently provides a consumer with new minimum payment information based on the accepted offer, thereby reducing the possibility of underpayment or overpayment by the consumer.

FIG. 1 is a representation of a billing statement according to one embodiment of the present invention. As will be described in greater detail below, the billing statement 1 may be generated by a bank, a credit card issuer, a billing service, or any other entity capable of generating billing statements. As shown, the billing statement 1 reflects information corresponding to a particular credit card account, including an itemized listing of transactions posted to the account.

Generation of a typical credit card billing statement involves several steps. Initially, an account is established with an issuing bank which associates a consumer (or consumers) with a particular credit card account number. The consumer receives a credit card including a magnetic strip encoding his particular account number, and the consumer submits the account number to a seller in order to purchase products and/or services therefrom. In this regard, the consumer may submit the account number to a seller by allowing the seller to scan and decode the account number from the magnetic strip or by transmitting the account number to the seller via the World Wide Web. Next, the seller transmits the account number along with various details of the transaction, such as a transaction date and time, a description of the product or service purchased, a purchase price, the seller's identity, etc. to a credit card clearinghouse such as CCH. The credit card clearinghouse forwards the information to an appropriate issuing bank based on the account number or to a billing statement generator designated by the appropriate issuing bank. According to the invention, a billing statement such as the billing statement 1 is then generated by the issuing bank or the billing statement generator using the forwarded information.

The billing statement 1 includes several types of information. For example, the billing statement 1 includes an account number 5 which was used to execute the transactions described in the billing statement. The billing statement 1 also includes contact information 10 which specifies a consumer with whom the account number 5 is associated. The contact information 10 may include a postal address, an Internet Protocol (IP) address, an e-mail address, or any other information that may be used to contact the consumer. Accordingly, the billing statement 1 may be transmitted by post, e-mail, or other means to the consumer described by the contact information 10.

For each transaction described in the billing statement 1, the billing statement 1 lists a transaction date 15, a description 20 of the transaction, an amount owed 25 and alternative payment information 30. The transaction date 15 may specify a date on which the transaction was authorized. The billing statement 1 may also, or alternatively, list a posting date for each transaction, which may be a date on which transaction settlement is reflected in the account. The description 20 may include, but is not limited to, descriptions of the particular product and/or service purchased and of the seller from whom the product and/or service was purchased. The amount owed 25 specifies the amount which the consumer agreed to pay for the product and/or service which is the subject of the associated transaction. In some embodiments, the description 20 includes one or more of the transaction date, the amount owed, the posting date, and any other information describing a transaction.

According to the present invention, the alternative payment information 30 may include an offer pointer and/or a statement offer. Offer pointers will be discussed first. Generally, an offer pointer includes information which a consumer can use to review an offer.

An offer pointer may be a Uniform Resource Locator (URL) referencing information contained in a website. For the present description, a URL is a data string that specifies how to access network resources, such as hypertext markup language (HTML) documents. A sample URL is "http://www.NeedNotPay.com/SmallCharge/1.htm", with "http" identifying one of many protocols which may be used to retrieve documents on a network, and with "www.NeedNotPay.com" being a hostname (referred to herein as a website) which can be resolved into an IP address using the Domain Name Service. The portion "SmallCharge/1.htm" identifies a directory and a document provided by the website. In a case in which this sample URL is used as an offer pointer, the document "1.htm" may include one or more offers.

An offer pointer may also include a relative URL, which specifies only a portion of a URL. In such a case, the unspecified portion of the URL is inferred from the context of the document in which the relative URL is located. For example, a consumer accesses a website maintained by an issuing bank to view an electronic copy of a billing statement. The billing statement appears similar to the billing statement 1 and includes a hyperlink associated with a listed transaction. The hyperlink references a relative URL specifying only a directory and a document in the directory. In order to access the document to which the relative URL refers, it is inferred that the protocol and website missing from the relative URL are those used to access the website of the issuing bank. It should be noted that both the hyperlink and the relative URL may be considered offer pointers in this example.

A URL offer pointer may reference a homepage of a website (e.g., http://www.NeedNotPay.com) which presents offers or hyperlinks to other Web pages presenting offers. Again, these offers need not have anything to do with the transaction with which the URL is associated on a billing statement. However, a URL offer pointer may be associated with a transaction based on an aspect of the transaction, such as the associated amount owed 25 or the description 20. That is, based on pre-existing rules, cross-subsidy offers, yield management techniques, or the like, a specific offer pointer may be tailored for association with a specific transaction (or type of transaction) on a billing statement. For example, if an amount owed 25 associated with a transaction is less than $5.00, a URL offer pointer may be associated with the transaction which references a page of a website providing offers appropriate for transactions associated with an amount owed 25 of less than $5.00 (e.g., "http://www.NeedNotPay.com/SmallCharge/1.htm"). In another example, a URL offer pointer "http://www.dontpay.com/any/cosmetics.htm" may be associated with a transaction if the transaction is associated with a description 20 of some type of cosmetic. Accordingly, it may be desirable for a Web page referenced by this URL to present offers which may be attractive to a consumer who purchases cosmetics.

In yet another example, transactions in a billing statement which are associated with an amount owed 25 of less than $5.00 are associated with a particular URL offer pointer, regardless of any other factors. However, when a consumer accesses a Web page corresponding to the offer pointer, he may be asked to enter identifying information such as his credit card account number. Based on this or other entered information, an offer is presented for review which may be different for a first consumer than an offer presented to a second consumer accessing the same Web page. The offers may differ in the benefit conferred, in the obligation to be performed, or both. For example, a more valued consumer may be presented with an offer having a less onerous obligation than an offer presented to a less valued consumer for a same benefit.

In addition to the factors mentioned in the foregoing examples, a particular offer pointer may be associated with a transaction based on factors such as the consumer's credit limit, credit history, address or geographic location, profile information, the current account balance, the minimum payment due, purchasing history, previously accepted offers, the time or date of the transaction, inventory, market conditions, yield management information, relationships with other consumers, or the like.

A URL offer pointer according to the invention may also include data to be passed to a website referenced by the URL. The data included in such an offer pointer may be formatted according to the Common Gateway Interface (CGI) format or another format for passing data from a network client to a server. For example, an offer pointer may read "http://www-.NeedNotPay.com/BigCharge/Code=X847Q". In this case, the data "Code=X847Q" may represent a particular offer which the website presents to a consumer in response to reception of the data, or details of a transaction (encoded or otherwise) with which the offer pointer is associated on a billing statement. In the latter case, the website may determine an appropriate offer or offers to present to the consumer based on the data and/or other information as discussed above with respect to offer pointers. Examples of offer determination based on transaction information will be discussed below. However, it should be noted that certain embodiments allow for less-complex generation of offer pointers because appropriate offers need not be determined before determination of the offer pointers.

A URL offer pointer may also identify the consumer to whom the offer pointer is presented. For example, the last four digits of a consumer's credit card account number may be hashed into a URL offer pointer as a means of identifying the consumer when the consumer submits the offer pointer to a website in order to review an offer.

In addition to URL's, offer pointers included in the alternative payment information 30 may comprise a telephone number. In order to use this type of offer pointer to review an offer, a consumer dials the telephone number and is presented with at least one offer for review. It should be noted that, like URL offer pointers discussed above, a telephone number offer pointer may be selected for association with the transaction because it allows access to offers which are appropriate in view of one or more characteristic(s) of the transaction, consumer, or other factor. Of course, the telephone number may simply allow review of one or more offers which are not particularized to the associated transaction.

Alternatively, a consumer calling a telephone number offer pointer may be presented with a VR menu through which the consumer navigates by selecting appropriate menu items before being presented with at least one offer for review. The menu items may correspond to details of the transaction to which the telephone number is associated, information regarding the consumer, or to any other information that may be used by the VR system to determine at least one offer to present to the consumer for review.

Included with a telephone number in an offer pointer may be a code or an extension number which is dialed after dialing the telephone number. The telephone extension may be dialed to access offers associated with the extension, and the code may be used to determine an appropriate offer to present to the consumer for review. As described above with respect to telephone number offer pointers, extension numbers or codes may allow consumers to access particular offers which are appropriate to an associated transaction or may simply reference one or more offers selected for other reasons. As described with respect to codes passed with URL offer pointers, an extension number or code may also represent a particular offer which is presented to a consumer in response to reception of the extension number or code, or details (encoded or not) of the associated transaction which are used to determine an offer to present to the consumer for review.

In addition to the foregoing, other offer pointers that may be used in accordance with the present invention include a television, cable, or satellite channel on which a consumer may review offers, a postal address from which a consumer may request to review offers, a geographic location to which a consumer may go to review offers, and Uniform Resource Identifiers, of which URLs are a subset. Moreover, it is considered that an offer reviewable using an offer pointer is associated with any transaction to which the offer pointer is associated.

It should be noted that any or all of the offer pointers discussed above may be used to review an offer to reduce or eliminate an amount owed 25 associated with a transaction to which an offer pointer is associated. For example, a consumer may access a Web page referenced by a URL offer pointer listed under the alternative payment information 30 and in association with a transaction. The Web page presents an offer to the consumer and, if the consumer accepts the offer, an amount owed 25 associated with the transaction is deducted from the consumer's account and the consumer is bound to abide by any obligation specified in the offer. In one embodiment, a party receiving the benefit of the obligation then pays the amount owed 25 to the issuing bank. Other types of settlement are discussed below.

As described above, alternative payment information 30 according to the present invention includes statement offers as well as offer pointers. A statement offer differs from offers reviewable using offer pointers only in that a statement offer is an offer included in a billing statement. Therefore, both statement offers and offers may be determined using any method discussed herein for determining either type of offer, and may have any characteristics attributed to either herein. For clarity, however, offers reviewable using offer pointers are referred to as "offers" and offers included in a billing statement are referred to as "statement offers".

A statement offer may be accepted by a consumer using a check box or other means, such as those described in parent application Ser. No. 09/100,684. A statement offer may explicitly describe a benefit, if any, which will be conferred upon an agreement to perform or upon performance of an explicitly described obligation, if any. A statement offer may also be presented in terms of an obligation to which the consumer may indicate agreement, wherein it is clear from the billing statement what benefit will be received by the consumer in return. For example, as shown on billing statement 1, alternative payment information 30 includes an implied statement offer to eliminate an amount owed 25 of $25.00 if the consumer agrees to change his long distance provider to NCI. In this case, an agreement to perform the obligation is deemed equivalent to acceptance of the implied statement offer. Determination of a statement offer to associate with a transaction on a billing statement may take into account details of the transaction, the consumer, or other factors. For example, determination of a statement offer may take into account any of those factors discussed above with respect to determination of an offer pointer or determination of an offer to present in response to a received offer pointer.

As alluded to above, offers and statement offers according to the invention may be associated with a transaction based on an amount owed 25 associated with the transaction. In one example, a long distance service provider may agree to pay an issuing bank $20.00 for each consumer who accepts a statement offer or an offer requiring the consumer to switch to the service. Based on this agreement, the issuing bank may associate such offers or statement offers with transactions associated with amounts owed in the range of $15.00 to $20.00. The benefit of an offer may be a reduction in an amount owed to a psychologically appealing number, such as $999.99 or $1000.00.

It should be noted that an offer or a statement offer associated with a transaction in accordance with the invention requires the consumer to fulfill some or no obligation in exchange for some or no benefit. Examples of obligations the consumer might be required to fulfill include: switching long distance telephone service providers; test-driving a particular car; making a minimum purchase at a merchant; answering an on-line survey; and referring a number of people to apply to the issuing bank for new credit card accounts. The obligations may also be associated with a deadline for fulfillment, after which the offer is void and/or a penalty is assessed against the consumer. If the obligation component of an offer requires a consumer to spend an amount, the consumer may be required to charge the amount to the account reflected in the billing statement. Such an obligation would benefit the issuing bank and compliance with the obligation would be easy to track.

The benefit of an offer or a statement offer to a consumer may be something other than a reduction of an account balance. Other possible benefits include: products and/or services, a reduction of an interest rate on revolving balances; a postponement of a payment due date; a reduction in a minimum payment due; an increased credit limit; an increased grace period; or any other benefit. The benefit of an offer may also be a rebate. For example, a consumer may accept an offer, pay a total amount owed on a credit card account, fulfill the obligation component of the offer, and then receive a rebate check from the controller 200. Alternatively, the rebate may come directly from the entity receiving a benefit of the obligation.

The benefit and/or the obligation of an offer or a statement offer may be based on information about a consumer or transactions executed by the consumer. For example, if a consumer has purchased a sweater using his credit card account, the consumer may be presented with an offer or a statement offer which requires the consumer to clean the sweater at a particular cleaner in exchange for a reduction in his account balance equal to the price of the sweater. Information on which benefits and/or obligations may be based also includes all the information which may be taken into account in the generation of offer pointers.

Returning to the general description of the billing statement 1, the current charges 40 reflect a total of the listed amounts owed 25. The previous charges owed 45 reflect charges not listed on the current billing statement 1 but owed by the consumer, and the finance charge 50 is a finance charge also owed by the consumer according to terms under which the credit card account was established. The total amount owed 55 is a sum of the current charges 40, the previous charges owed 45 and the finance charge 50. Although only the total amount owed 55 is associated with alternative payment information 30 in FIG. 1, it should be noted that any of the current charges 40, the previous charges owed 45 and the finance charge 50 may also be associated with alternative payment information 30. In this regard, the total amount owed 55, the current charges 40, previous charges owed 45, the finance charge 50 and other information which may be contained in the billing statement 1 are considered descriptions of transactions, wherein offer pointers, statement offers and/or offers that are associated therewith are also to be considered associated with the transactions described thereby.

A minimum due 60 and a due date 65 are also shown on the billing statement 1. Associated with the minimum due 60 is alternative payment information 30 in the form of an implied statement offer to discharge the consumer of his duty to pay the minimum due 60 by the due date 65. Acceptance, processing and settlement of such a statement offer is described in detail with respect to FIG. 18.

Elements 70 through 80 on the billing statement 1 may be used by the consumer for record-keeping purposes. Specifically, the modified total amount owed entry area 70 allows a consumer to record a total amount owed which is different from the total amount owed 55 due to acceptance of an offer or a statement offer, and the modified minimum due entry area 75 and the modified due date entry area 80 allow a consumer to record any modifications to the minimum due 60 or the due date 65 resulting from acceptance of an offer or a statement offer.

It should be noted that even though the billing statement 1 associates a statement offer or an offer pointer with a transaction by including the statement offer or offer pointer on a same line as other information associated with the transaction, it should be noted that a statement offer or an offer pointer may be associated with a transaction in many other ways according to the present invention. For example, a statement offer or an offer pointer may appear above or below information regarding a transaction to which the statement offer or offer pointer is associated. Moreover, a single statement offer or offer pointer may be associated with one or more listed transactions. In another embodiment, the billing statement 1 contains a printed explanation of which offer pointers or statement offers are associated with which listed transactions. In other embodiments, a transaction is associated with a statement offer or an offer pointer by placing a number or other symbol next to an element describing the transaction such as the transaction date 15, the description 20 or the amount owed 25 and by printing the statement offer or offer pointer next to an identical symbol elsewhere in the billing statement, in accompanying papers, in a guide provided to the consumer in hardcopy form, on a Web page, or using any other known method for communicating information to a consumer.

It should also be noted that a statement offer or an offer pointer may be considered to be associated with a transaction according to the present invention if it is associated with any of the current charges 40, the previous charges owed 45, the finance charge 50, the total amount owed 55, the minimum due 60 and the due date 65, since each of these elements are associated with at least one transaction. Moreover, a transaction may be associated with one or more offer pointers and/or one or more statement offers, and one or more offer pointers and/or one or more statement offers may be associated with one or more transactions.

Although the billing statement 1 corresponds to a credit card account, the present invention may be used in conjunction with any other type of billing statement, such as those corresponding to utility service, telephone service, cable television service, Internet service, loan installments, car payments, or any other product and/or service for which a consumer is billed, either before or after a purchase. In addition, a billing statement may include reminders to fulfill the obligation components of offers a consumer has previously accepted.

A billing statement in accordance with the invention need not be in hardcopy form. Rather, such a billing statement may be in any perceptible form, such as an HTML document viewable by a Web browser, a data structure in another form viewable by known or future systems, or an audio file. In this regard, a hardcopy billing statement may contain an offer pointer which a consumer may use to view an electronic version of the billing statement. The consumer may select one or more of the transactions shown in the electronic version using hyperlinks or other techniques, and may, in response, receive offers for reducing an amount owed associated with the selected transaction(s).

System

FIG. 2 is a block diagram illustrating a system for generating billing statements according to embodiments of the present invention. Of course, other systems may be used to practice the invention. As shown, the system includes an issuing bank device 100 in communication with a controller 200. The controller 200 is also in communication with a subsidizing merchant device 300 and a consumer device 400. Multiple physical devices may be used to perform the functions of each element of FIG. 2 according to the present invention, and some or all of these functions may also be performed manually.

Although one consumer device 400 is shown in FIG. 2, any number of consumer devices may be in communication with the controller 200 according to the invention. Similarly, any number of issuing bank devices 100 or subsidizing merchant devices 300 may be in communication with the controller 200. The latter arrangement is particularly beneficial in a case where the controller 200 is operated by an entity providing billing statement generation and/or offers via billing statements in accordance with the present invention.

Furthermore, although the communication media between the issuing bank device 100, the controller 200, the consumer device 400 and the subsidizing merchant device 300 are represented by dedicated connections, it should be understood that one or more of the illustrated devices may be connected to a network, such as a Local Area Network or a Wide Area Network, to which is also connected at least one of the remaining devices. The network may be an IP-based network, such as the World Wide Web, and/or one or more of a satellite based network, a cellular network, a radio frequency network, a telephone network, a cable television network, or any other communication system for transferring data between locations.

Those skilled in the art will understand that devices in communication with each other need not be continually transmitting to each other. On the contrary, such devices need only to transmit to each other as necessary, and may actually refrain from exchanging data most of the time. For example, a device in communication with another device over the World Wide Web may not transmit data to the other for weeks at a time.

A description of operation of the system of FIG. 2 in accordance with one embodiment of the invention is set forth below. The description includes many optional and alternative methods which may be used to practice the invention. It should be understood that the invention is not deemed limited to the methods set forth in the description.

Billing Statement Generation

Initially, it is assumed that a consumer has been issued a credit card by an issuing bank operating the issuing bank device 100. The credit card may be issued according to any known method, and the issuing bank device 100 may store information associated with the credit card, such as a consumer name, address and an account number. Of course, in a case that a billing statement for an account other than a credit card account is to be generated according to the invention, the issuing bank device 100 may be substituted with a device operated by an entity maintaining the other account.

As described above, the issuing bank device 100 may be in communication with a credit card clearinghouse for obtaining credit card transaction information. In one embodiment, the issuing bank device 100 receives from the credit card clearinghouse transaction information associated with transactions conducted using credit cards issued by the issuing bank device 100. The issuing bank device 100 may also receive this transaction information directly from sellers conducting the transactions.

Once the transaction information is received, the issuing bank device 100 may generate a billing statement including a description of a transaction and an offer pointer associated with the transaction, wherein the offer pointer includes information that may be used to review an offer. Furthermore, the issuing bank device 100 may provide generation of a billing statement including a description of a transaction and an offer associated with the transaction, wherein the offer is an offer to reduce an amount owed associated with the transaction. In the latter case, the offer may be a statement offer or an offer reviewable using an offer pointer.

In one embodiment, the issuing bank device 100 generates a billing statement by determining, for at least one transaction included in the received transaction information, an offer pointer and/or a statement offer to associate with the transaction. Rather than determining offer pointers and/or statement offers to associate with a transaction, the issuing bank device 100 may transmit associated transaction information to the controller 200, which determines and transmits the offer pointers and/or statement offers back to the issuing bank device 100. For example, in a case that a transaction is associated with an amount owed of less than $50.00, the controller 200 may determine an offer pointer to associate with the transaction that directs the consumer to a Web page presenting offers which, if accepted, result in elimination of amounts owed which are less than $50.00. Such offers may be transmitted to the controller 200 from the subsidizing merchant device 300. The issuing bank device 100 may also store offers received from the subsidizing merchant device 300. In this regard, the subsidizing merchant device 300 may provide subsidy offers from one or more subsidizing merchants and will be discussed in more detail below.

In another embodiment, transaction information is received by the controller 200 directly from sellers or from the credit card clearinghouse, and the determination of statement offers and offer pointers is thereafter performed by the controller 200, the issuing bank device 100 or another device.

Of course, billing statement generation according to the invention may be performed by an entity other than the issuing bank device 100. For example, the issuing bank device 100 may transmit received transaction information to an entity which operates as described above to generate billing statements for the issuing bank based on the transaction information. As described with respect to the controller 200, the transaction information may be received by the entity directly from sellers or from the credit card clearinghouse.

Presenting Offers for Review

The determination of offers for consumer review may occur prior to the determination of offer pointers to associate with transactions on a billing statement. That is, the controller 200 may determine an offer based on transaction information and then determine an offer pointer which can be used by a consumer to review the offer. Using the determined information, the controller 200 or another device may generate a billing statement associating the offer pointer with the transaction.

In a case that the issuing bank device 100 determines an offer pointer based on transaction information, the transaction information may be transmitted to the controller 200 for determination of a corresponding offer. Alternatively, the offer pointer itself may be transmitted to the controller 200 for determination of a corresponding offer. Of course, the offer pointer transmitted to the controller 200 may include transaction information which is used by the controller to determine the offer.

Offers may also be determined anytime after the billing statement is generated. These embodiments provide flexibility and control in determining an appropriate offer to present to a consumer. For example, a Web page referenced by an offer pointer associated with a transaction on a billing statement may be periodically updated with new offers such that consumers accessing the Web page at different times may review different offers. In another example, an offer corresponding to an offer pointer may be determined only after the offer pointer is used by the consumer device 400 to access an offer. In one such embodiment, the issuing bank device 100 generates a billing statement including offer pointers associated with transaction information, wherein the offer pointers can be used by the consumer device 400 to access a Web page provided by a Web server executing in the controller 200. The Web page requests consumer-specific or transaction-specific information from the consumer device 400, such as the transaction date, the description, or the amount owed as a result of the transaction, and the controller 200 thereafter determines and generates an offer to transmit to the consumer device 400 for review, the offer being based on the received transaction information.

In a variation of the foregoing, an offer pointer generated by the issuing bank device 100 may indicate transaction information but might not be directly associated with a particular offer. Therefore, when the consumer device 400 uses the offer pointer to access the controller 200, the controller 200 determines an offer or offers to present to the consumer, the determined offer being based on the transaction information indicated by the offer pointer, and/or other information, such as inventory, market conditions, revenue management information, or the like.

Of course, offers corresponding to offer pointers may be determined by the issuing bank device 100 instead of the controller 200, or by any other device. In any case, offers and statement offers may be chosen from offers stored in the controller 200, received from the subsidizing merchant device 300 or received from another device.

In one embodiment, the controller 200 includes systems required to receive requests for offers from the consumer device 400. For example, the controller 200 may be physically connected to the World Wide Web and may maintain a website which can be accessed using URL offer pointers presented in a billing statement. In this regard, the website may also transmit a billing statement to the consumer device 400 which includes hyperlink offer pointers selectable in order to request offers for review.

The controller 200 may also connect to the telephone network and maintain a VR unit to respond to calls from the consumer device 400 to a telephone number offer pointer listed in a billing statement. If such a call is received, the controller 200 presents an appropriate offer to the consumer device 400 for review. As previously described, an appropriate offer may be determined based on the telephone number, on consumer responses to a program executed by the VR unit, on a dialed code or extension number which specifies a particular offer or encodes transaction information, or on any other considerations for determining offers mentioned herein. In one embodiment, the controller 200 receives offers from the subsidizing merchant device 300 and determines an offer to present to the consumer based on the received offers.

In some embodiments, the issuing bank device 100 may inform the controller 200 of which offer pointers were included in billing statements of particular consumers. Accordingly, if a consumer attempts to review offers by accessing the controller 200 using an offer pointer which was not included in his billing statement, the controller 200 informs the consumer that the offer pointer is not valid. This feature may serve to prevent a consumer from trying to obtain offers that are not meant for him.

Receiving Acceptance of an Offer

Once an offer is presented to a consumer for review through the consumer device 400, the controller 200 may provide the consumer with means for accepting the offer. For example, in a case that an offer is presented via a Web page, the Web page may include an "accept" button selectable by the consumer using the consumer device 400. Upon receiving an indication that the "accept" button was selected, the controller 200 determines that the offer was accepted. If an offer is presented via a recording played by a VR unit in the controller 200, a consumer may transmit his acceptance by voice, or by pressing an indicated combination of keys on the consumer device 400 (e.g., a telephone) to accept the offer.

Prior to accepting an offer, a consumer may, in one embodiment, obtain further information about the offer. For example, a "details" button on a Web page presenting the offer may be selected using the consumer device 400 and, in response, the controller 200 may transmit a Web page to the consumer device 400 including further details about the offer.

A consumer may also enter into a negotiation process with the controller 200 prior to accepting an offer. For example, the controller 200 may present an offer to a consumer through the consumer device 400 which will eliminate $20 from the consumer's account. Next, the consumer may ask that the offer eliminate $30 from the account. The controller 200 may reject the new terms, accept the new terms, or present another offer.

In one embodiment, a consumer is presented with the option of selecting one or more offers from amongst several offers. For example, the consumer may accept three presented offers having associated benefits totalling an amount owed due to a particular transaction. In some embodiments, the associated benefits may exceed the amount owed, and may even exceed a total amount owed to the issuing bank device 100.

Furthermore, the acceptance of some offers may affect a consumer's ability to accept other offers. In this regard, if a consumer accepts an offer to eliminate a $20 amount owed from the consumer's account, the consumer may thereafter be unable to review other offers to eliminate the same amount owed. On the other hand, a consumer's acceptance of one offer may trigger the controller 200 to present other offers to the consumer, either related or unrelated to the accepted offer. For example, a consumer who accepts an offer having an obligation to try a home burglar alarm system for one month might be presented with an offer to sell a car alarm system.

Settlement

Once the controller 200 has received an indication of the consumer's acceptance of an offer, the controller 200 may transmit to the consumer device 400 an indication of a new amount owed by the consumer in view of the accepted offer. The transmission may include a modified total amount owed and/or a modified minimum amount due, as described with respect to entry areas 70 and 75 of the billing statement 1. For example, if a consumer accepts an offer to switch long distance service to NCI, the controller 200 might transmit to the consumer device 400 a message such as "Ignore the charge for that suit. Your new, reduced balance is $172.50 and your minimum payment due is $12.03."

Additionally, the consumer may be instructed to check a check box on his billing statement indicating that a corresponding amount owed need not be paid, and/or to write a modified total amount due on the billing statement. These actions may serve to alert the issuing bank device 100 to the details of the offer. In other embodiments, these actions are immaterial except in providing the consumer with a sense of relief, accomplishment, or gratification. The controller 200 may also provide a code to a consumer after the consumer has accepted an offer, with instructions to write the code on his billing statement. The code may allow the issuing bank device 100 to verify that a party other than the consumer has assumed part of the debt reflected in the billing statement.

The controller 200 may also transmit a new amount owed, a modified total amount owed, a modified minimum amount due and/or any other account information which may have changed due to the accepted offer to the issuing bank device 100. The issuing bank device 100 may then update corresponding stored account information based on the received information. Alternatively, the issuing bank device 100 may be notified that an offer has been accepted, and may calculate and update corresponding stored account information accordingly.

In the case of an offer received by the controller 200 from a subsidizing merchant and presented to a consumer, the controller 200 may notify the subsidizing merchant once the offer is accepted. For example, if a long distance telephone service provider has input an offer to the subsidizing merchant device 300 and the offer is transmitted therefrom to the controller 200, the offer may be transmitted to a consumer during operation of a system according to the invention. If the offer is subsequently accepted, the controller 200 may notify the service provider of the acceptance through the subsidizing merchant device 300. In the case that the subsidizing merchant device 300 collects offers from more than one subsidizing merchant, the controller 200 may notify the service provider directly of the acceptance.

Upon receiving notification of the acceptance, the subsidizing merchant may then execute any actions needed for the consumer to fulfill any agreed-to obligation. For example, a long distance service provider may switch a consumer to its long distance service once notified that the consumer has accepted an offer including an obligation to switch to the long distance service. The provider may, however, wait for the consumer to perform some action, such as confirming the acceptance by mail, before switching the consumer to its service.

In some embodiments, the controller 200 instructs the consumer to notify the subsidizing merchant device 300 or the subsidizing merchant of any obligation included in an accepted offer. In other embodiments, the subsidizing merchant device 300 or the subsidizing merchant may not be notified of the accepted offer until after the consumer has fulfilled a corresponding obligation.

After an offer has been accepted by a consumer using the consumer device 400, the controller 200 may notify the issuing bank device 100 to apply any benefit associated with the offer to the consumer's account. For example, if an offer specifies that an amount owed associated with a transaction will be eliminated in exchange for performance of a particular obligation, the controller 200 notifies the issuing bank device 100 to eliminate the amount owed from the consumer's account. In some embodiments, the issuing bank device 100 is reimbursed for the benefit by the controller 200, either before or after the corresponding obligation is performed. If the benefit received by the consumer is not strictly monetary (e.g. a reduced interest rate on an outstanding balance), then the issuing bank device 100, or some other entity, may use a formula in order to determine a monetary value of the benefit, which is paid to the issuing bank device 100.

It should be noted that the issuing bank device 100 may be reimbursed for an amount less than or greater than the monetary value of the benefit applied to the consumer's account. For example, the controller 200 may pay the issuing bank device 100 an additional fee for the right to print statement offers and offer pointers on billing statements issued by or for the issuing bank device 100. Alternatively, the controller 200 may extract a fee from the issuing bank device 100 in exchange for providing consumers with incentive to open credit card accounts with the issuing bank.

The controller 200 may recoup the money paid to the issuing bank device 100 as described above. In this case, the controller 200 may be reimbursed by the subsidizing merchant device 300 or by whatever other entity or entities received a benefit from the obligation. The controller 200 may be paid more or less than the controller 200 paid the issuing bank device 100. For example, the controller 200 may be paid more for providing the subsidizing merchant device 300 or other entity with a new customer.

In other embodiments, the subsidizing merchant device 300 pays the issuing bank device 100 directly, rather than paying the controller 200 after the controller 200 has paid the issuing bank device 100. Once again, the subsidizing merchant device 300 may pay the issuing bank device 100 more or less than the benefit applied to the consumer's account by the issuing bank device 100.

The controller 200 may require notification from the subsidizing merchant device 300 or other entity that an obligation has been performed before notifying the issuing bank device 100 to apply a corresponding benefit to the consumer's account. Also, the subsidizing merchant device 300 might not pay the controller 200 until the consumer has fulfilled the obligation. If an obligation is associated with a deadline for completion and has not been fulfilled by the deadline, the associated offer may be revoked and any benefit previously applied to the consumer's account may be removed. In addition, a penalty charge might be added to the account.

In an example of settlement according to one embodiment of the invention, a consumer accepts an offer requiring him to test drive a car in exchange for the removal of a $23.00 charge from his credit card account. The offer was provided to the controller by the subsidizing merchant device 300, which is operated by the manufacturer of the car. After receiving the acceptance, the controller 200 pays $23.00 to the issuing bank device 100 and the issuing bank device 100 removes the charge from the account. However, the manufacturer does not pay $23.00 to the controller 200 until the consumer has test-driven the car. If the consumer fails to test-drive the car, the issuing bank device 100 may pay $23.00 back to the controller 100 and add the charge back to the account. In this regard, the issuing bank device 100 may reserve an amount of unused credit on the credit card account equal to $23.00. Thus, the charge can be reinstated on the account without exceeding the account's credit limit.

One or more of the issuing bank device 100, the controller 200, and the subsidizing merchant device 300 may verify that a consumer has fulfilled an obligation under an offer. In one embodiment, the controller 200 and/or the issuing bank device 100 receive verification from the subsidizing merchant device 300 that the obligation has been fulfilled. Such an embodiment may be most practical in a case that the obligation benefits of the entity operating the subsidizing merchant device 300 or to an entity providing offers which are transmitted to the controller 200 through the subsidizing merchant device 300. In another embodiment, the subsidizing merchant device 300 or other entity may provide to the consumer a receipt or a code after fulfillment of the obligation which can be transmitted from the consumer device 400 to the controller 200 or to the issuing bank device 100 and verified thereby.

Of course, the consumer may fulfill his obligation directly with the issuing bank device 100 or with the controller 200. For example, the obligation may require the consumer to use the consumer device 400 to access a website maintained by the controller 200, and to answer a number of survey questions presented thereon. In this case, the controller 200 detects that the consumer has fulfilled his obligation once an answer to each question has been received.

Devices

Issuing Bank Device

Figure 3:
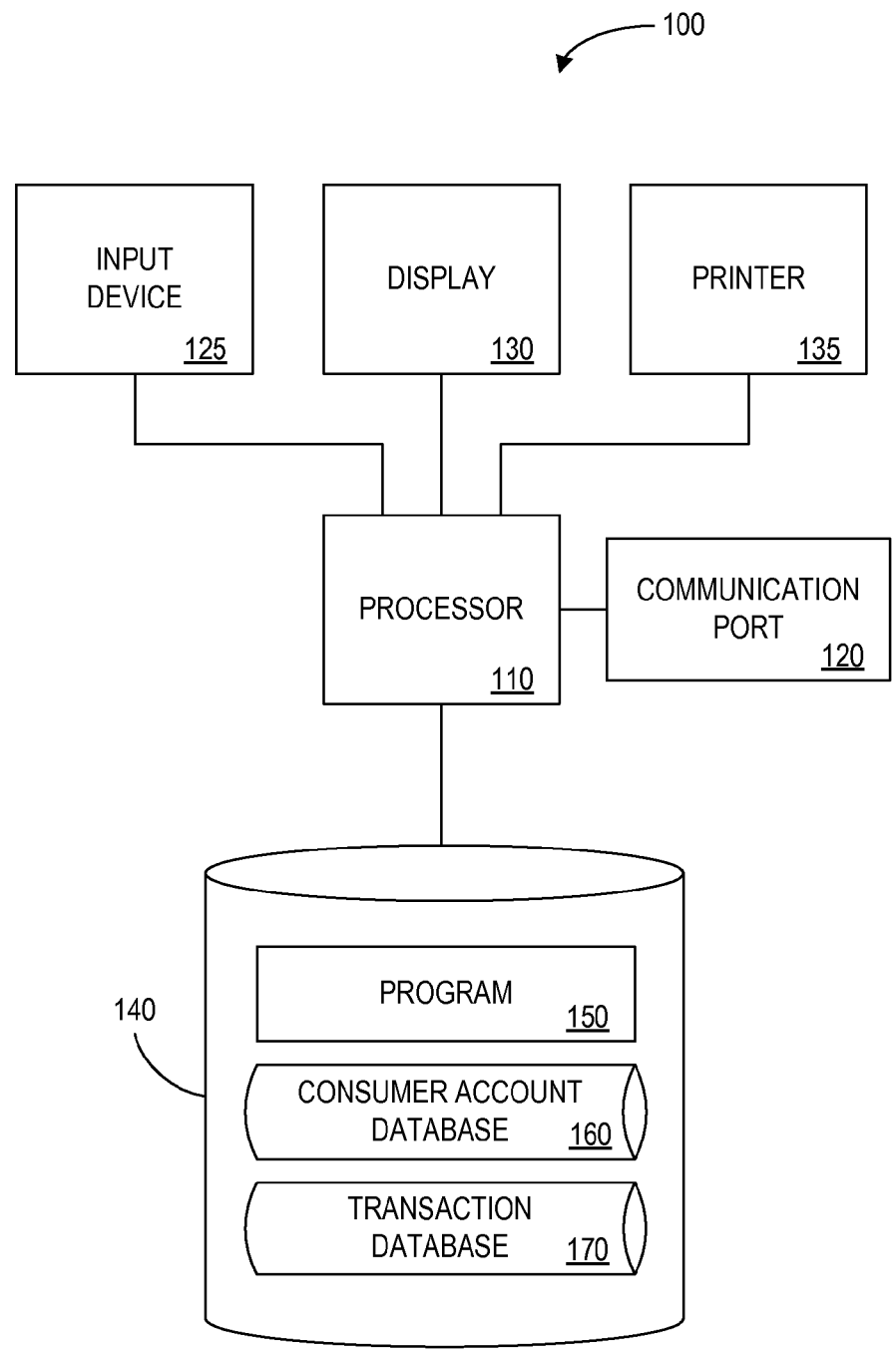
FIG. 3 is a block diagram of an issuing bank device according to one embodiment of the present invention.

FIG. 3 illustrates a block diagram of one embodiment of the issuing bank device 100 according to the present invention. As described above, the issuing bank device 100 may be operated by an entity which issues credit cards to consumers, receives credit card transaction information and/or generates billing statements for delivery to consumers. The issuing bank device 100 may be implemented using a network server, a dedicated hardware circuit, an appropriately-programmed general-purpose computer, another electronic, mechanical or electro-mechanical device, or any combination thereof. In addition, the elements of FIG. 3 may be located entirely within a single computer or other computing device, or connected to each other by remote communication media such as a serial port cable, telephone line or radio frequency transceiver. In one embodiment, the issuing bank device 100 comprises one or more computers and peripheral devices.

The issuing bank device 100 of FIG. 3 comprises a processor 110, such as one or more RISC® processors. The processor 110 is coupled to a communication port 120 through which the issuing bank device 100 communicates with other devices. For example, according to one embodiment, the issuing bank device 100 receives transaction information from a credit card clearinghouse and transmits transaction information to the controller 200 through the communication port 120. The issuing bank device 100 may also receive information regarding accepted offers from the controller 200 over the communication port 120. Accordingly, the communication port 120 is configured, in one embodiment, to communicate using hardware and software protocols of the media connecting the communication port 120 with other devices with which the issuing bank device 120 communicates. It should be noted that the issuing bank device 100 may also communicate with locally-attached devices through the communication port 120.

Also connected to the processor 110 are an input device 125, a display 130 and a printer 135. The input device 125 may be any device for inputting data, such as keyboard, a touch screen, a mouse, a voice input device, an infrared port, or the like. The input device 125 may be used by issuing bank personnel to enter data used by the issuing bank device 100 in accordance with the present invention, such as transaction information, consumer data, rules for determining offers and offer pointers, offer information, or the like.

The display 130 is used to output graphics and text and may be a CRT computer monitor, a flat panel display or another type of display device. Graphics, text or other data may also be output by the printer 135 in hardcopy format. The printer 135 may also be used to print hardcopies of billing statements generated by the issuing bank device 100 or any other device according to the present invention. The printer may be any type of printer, such as a laser printer, a thermal printer, an inkjet printer, and a dot-matrix printer.

The processor 110 is also in communication with a data storage device 140. The data storage device 140 is generally a data memory and may include any combination of magnetic, optical and/or semiconductor memory. The data storage device 140 may also include, for example, Random Access Memory (RAM), Read Only Memory (ROM), a compact disc and/or a hard disk. The data storage device 140 stores a program 150 of processor-executable process steps. The program 150 may be stored in a compressed, uncompiled and/or encrypted format. The program 150 may be stored in the storage device 140 during manufacture of the storage device 140, may be downloaded from a compact disc or other computer-readable medium, or may be retrieved from a remote or local source through the communication port 120 in the form of a signal having the program 150 encoded thereon. The processor 110 executes the process steps of the program 150 and thereby operates in accordance with the present invention, and particularly in accordance with the steps described herein with respect to the issuing bank device 100. In one example, the process steps of the program 150 are executed by the processor 110 to generate a billing statement including a description of a transaction and an offer pointer associated with the transaction, wherein the offer pointer includes information that may be used to review an offer. In another example, the processor 110 executes steps of the program 150 to generate a billing statement including a description of a transaction and an offer associated with the transaction, wherein the offer is an offer to reduce an amount owed associated with the transaction.

According to one embodiment, the steps of the program 150 are transferred from the data storage device 140 into a main memory, such as a RAM, and executed therefrom by the processor 110. In alternate embodiments, hard-wired circuitry may be used in place of, or in combination with, processor-executable software process steps for implementation of the processes of the present invention. Thus, embodiments of the present invention are not limited to any specific combination of hardware or software.

The data storage device 140 also stores processor-executable process steps for basic operation of the issuing bank device 100, such as process steps of an operating system, a Web server, a database management system and device drivers for allowing the issuing bank device 100 to interface with peripheral devices. These latter process steps are known to those skilled in the art, and are therefore not shown or described in detail herein.

The storage device 140 also stores a consumer account database 160 and a transaction database 170. Briefly, the consumer account database 160 stores information concerning consumers holding accounts at the issuing bank, such as account number, name, transaction information, etc. The transaction database 170 includes details of transactions executed by consumers using credit cards issued by the issuing bank. Each of these databases will be described in detail below.

Controller

Figure 4:
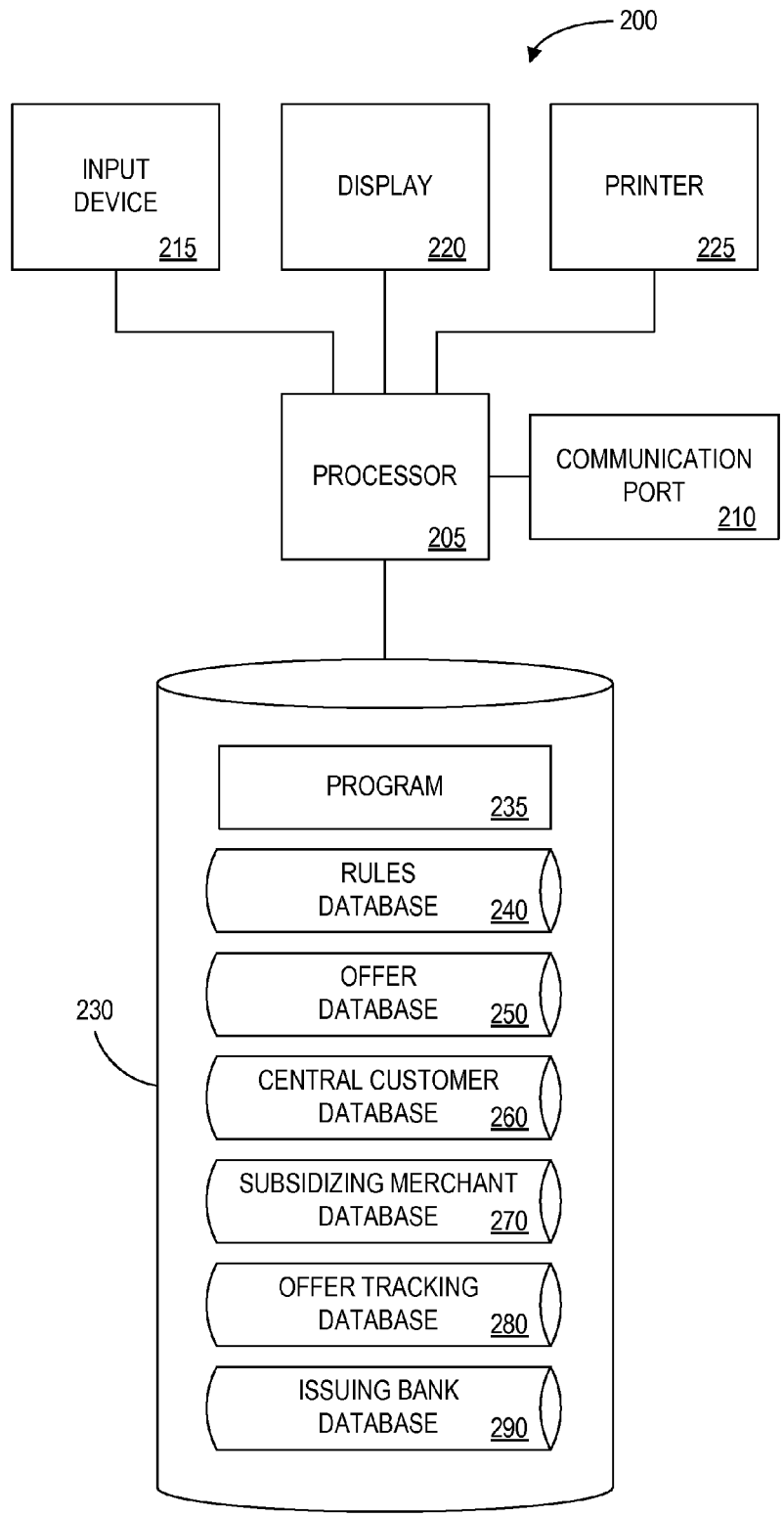
FIG. 4 is a block diagram of a controller according to one embodiment of the present invention.

FIG. 4 illustrates several elements of the controller 200. As described above, the controller 200 is used in one embodiment to generate billing statements according to the present invention. The controller 200 may also be used to receive requests to review offers using offer pointers, to determine offers to present to consumers, and to transmit the determined offers to the consumer. The controller 200 also controls, in one embodiment, settlement of accounts between consumers, the issuing bank and subsidizing merchants.

The controller 200 includes a processor 205 connected to a communication port 210. The communication port 210 is configured to transmit data to and to receive data from the issuing bank device 100 via a network connection, such as the World Wide Web, via an intermediate device, via a dedicated connection, or via another connection. Similarly, the communication port 210 is configured to communicate with the consumer device 400 and the subsidizing merchant device 300. In one embodiment, the consumer device 400 communicates with the controller 200 via the World Wide Web and, in another embodiment, the consumer device 400 communicates with the controller 200 via the telephone network. The subsidizing merchant device 300 may also communicate with controller 200 via any type of network.

Also connected to the processor 205 are an input device 215, a display device 220 and a printer 225. The input device 215 may be used by an entity operating the controller 200 to input data and instructions to the controller 200. The input device 215 may also be used by consumers to transmit information needed to receive an offer from the controller 200 in a case that the controller 200 is a device which is accessible to consumers, such as a publicly-located kiosk. In this regard, the display 220 may be used to display offers to a consumer for review. The printer 225 may be used to generate hardcopies of billing statements in accordance with the present invention, particularly in embodiments wherein the controller 200 generates the billing statements. The printer 225 may also be used to generate reports from data collected by the controller 200. It should be noted that the input device 215, the display 220 and the printer 225 may comprise any of the input devices, displays, or printers described above.

A storage device 230 is also connected to the processor 205, and stores data and processor-executable process steps for the operation of the controller 200. The storage device 230 stores, in particular, a program 235 of processor-executable process steps which may be executed by the processor 205 to provide functionality based on embodiments of the invention in which the controller 200 is utilized. For example, in a case that offers are determined by the issuing bank device 100 and billing statements are printed by the controller 200, the processor 205 may execute the process steps of the program 235 to receive offer information from the issuing bank device 100, to generate offer pointers based on the received offer information, to generate a billing statement including a description of a transaction and an offer pointer associated with the transaction, wherein the offer pointer includes information that may be used to review the offer information. Of course, since, as described above, functions performed by the controller 200 depend upon the embodiment in which the controller 200 is operated, the program 235 may include process steps different from or in addition to those described above. The process steps of the program 235 may be stored in the storage device 230 during its manufacture, may be downloaded from a compact disc or other computer-readable medium, or may be retrieved from a remote or local source through the communication port 210 embodied in a signal having the process steps encoded therein.

The storage device 230 also stores: i) a rules database 240 containing rules for generating offers, statement offers and/or offer pointers based on transaction information; ii) an offer database 250 containing offer details; iii) a central consumer database 260 including data specific to particular consumers; iv) a subsidizing merchant database 270 including subsidy offer information; v) an offer tracking database 280 for assisting in tracking the fulfillment and settlement of accepted offers; and vi) an issuing bank database 290 including data facilitating communication and settlement with one or more issuing bank devices 100 in communication with the controller 200. Details and use of each database are explained below.

Subsidizing Merchant Device

Figure 5:
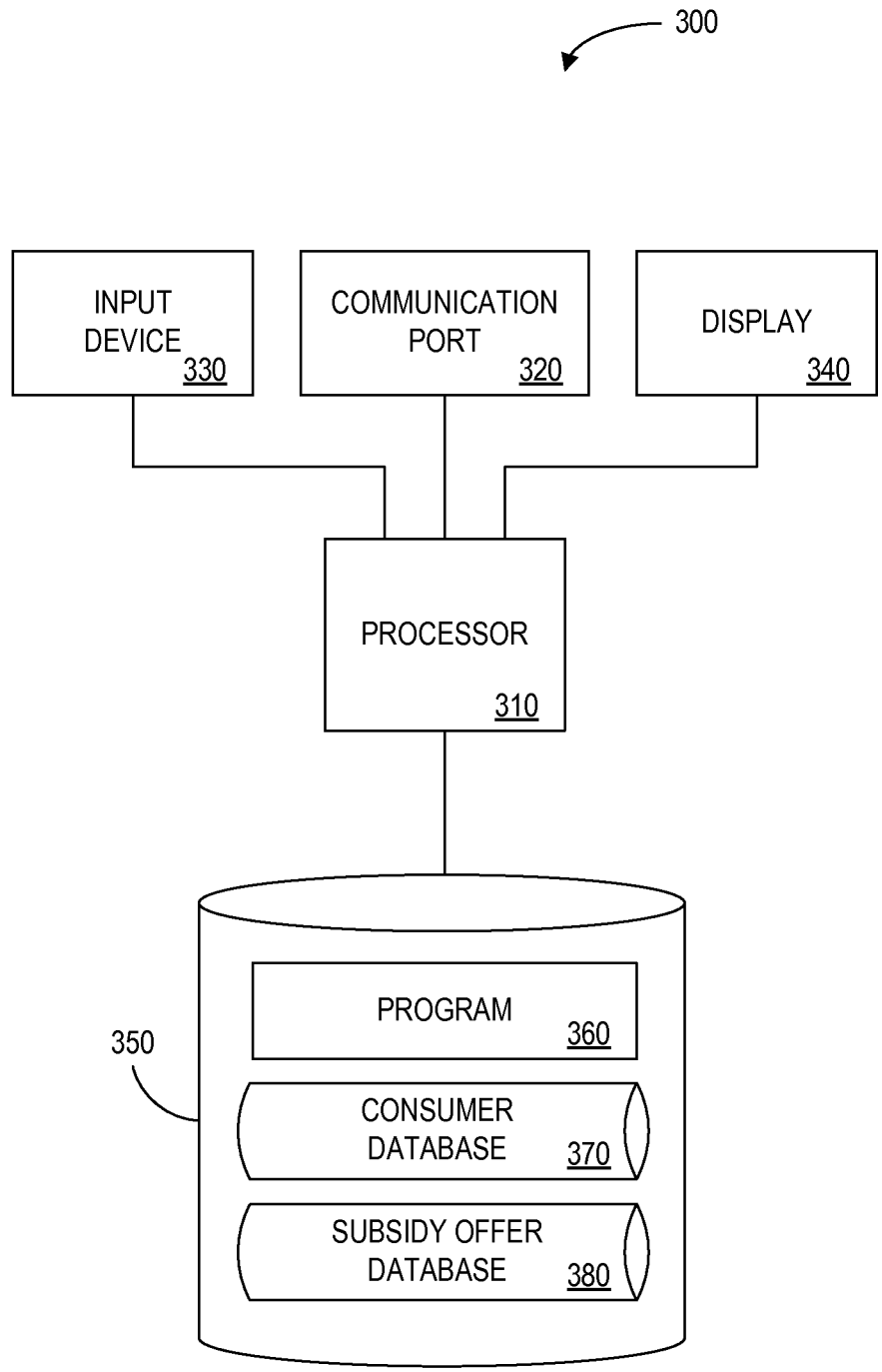
FIG. 5 is a block diagram of a subsidizing merchant device according to one embodiment of the present invention.

FIG. 5 illustrates a block diagram of several components of the subsidizing merchant device 300. The subsidizing merchant device 300 is used in some embodiments to communicate subsidy offers to the controller 200 and to track fulfillment of agreed-to obligations. The subsidizing merchant device 300 may be operated by a single merchant and may store offers from only that merchant or from several different merchants. In this regard, the subsidizing merchant device 300 may be in communication with one or more merchant devices (not shown), through which individual merchants may submit offers to the subsidizing merchant device 300.

As shown, the subsidizing merchant device 300 includes a processor 310 for executing processor-executable process steps and for controlling components in communication therewith. In this regard, a communication port 320 is in communication with the processor 310. Data such as subsidy offer information may be transmitted to the controller 200 from the subsidizing merchant device 300 over the communication port 320.

Also connected to the processor 310 are an input device 330 and a display 340, which may used by personnel operating the subsidizing merchant device 300 to enter subsidy offer information, consumer information or the like into the subsidizing merchant device 300. In one embodiment, such subsidy offer information is transmitted to the controller 200 for storage in the offer database 250.

Storage device 350 is also in communication with the processor 310, and stores at least a program 360 of processor-executable process steps, a consumer database 370 and a subsidy offer database 380. The process steps of the program 360 may be executed by the processor 310 to receive a request from the controller 200 for subsidy offer information, to retrieve subsidy offer information from the subsidy offer database 380, and to transmit subsidy offer information to the controller 200. In another embodiment, the processor 310 executes the process steps of the program 360 to receive consumer information, and to determine subsidy offer information from the subsidy offer database 380 to transmit based on the consumer information and based on the information stored in the consumer database 370. For example, the subsidizing merchant device 300 may transmit one subsidy offer if it is indicated in the consumer database 370 that the consumer to whom the offer will be presented is a preferred consumer, and a different subsidy offer to the consumer if it is indicated that the consumer is not a preferred consumer.

Consumer Device

Figure 6:
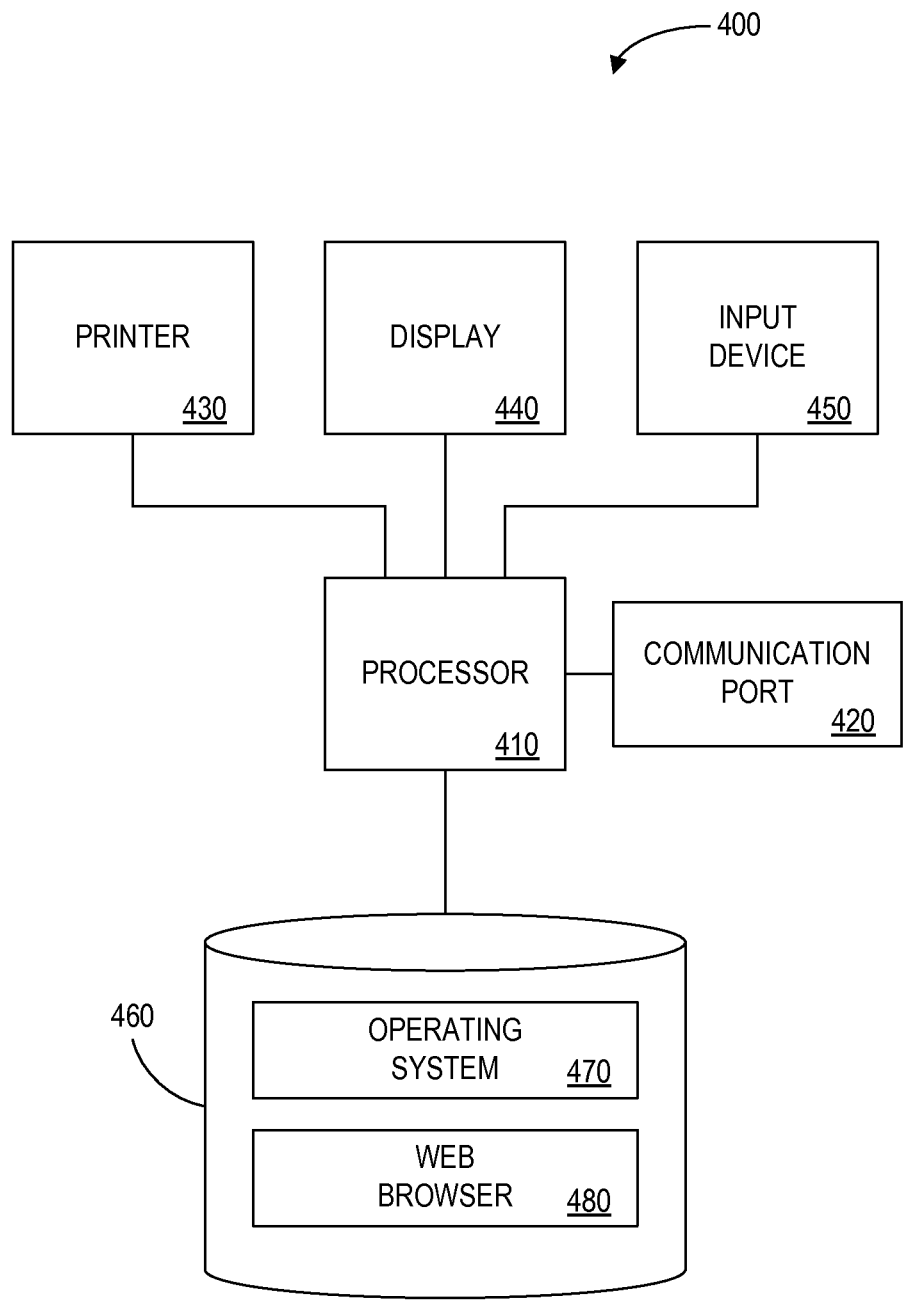
FIG. 6 is a block diagram of a consumer device according to one embodiment of the present invention.

FIG. 6 shows a block diagram of several components of the consumer device 400 according to one embodiment of the invention. The consumer device 400 may be used to view a billing statement, to request to review offers using an offer pointer printed on a billing statement in association with a transaction, and/or to accept offers to reduce an amount owed associated with a transaction contained in a billing statement.

The consumer device 400 may be any device or combination of devices usable by a consumer to request offers for review using an offer pointer and to review offers presented in response. For example, the consumer device 400 may be one or more of a dedicated kiosk, a personal computer, a personal digital assistant, an Internet kiosk, a telephone, a set-top box, a pager, a cellular phone, a payphone, a video game, an automated teller machine, a slot machine, a watch, a vending machine, an in-car communication system, or any other device adapted to communicate with the controller 200 over whatever communication media exist between the device 400 and the controller 200. As shown in FIG. 6, however, the consumer device 400 is a device for communication with the controller 200 over the World Wide Web.

More specifically, the consumer device 400 includes a processor 410 in communication with a communication port 420. The communication port 420 is configured to transmit data to the controller 200 via the World Wide Web over any suitable network or networks and to receive data therefrom. Also connected to the processor 410 are an input device 430 for receiving data and instructions from a consumer, a display 440 for displaying data to the consumer, and a printer 430 for creating a hardcopy of data, such as of details of an offer which has been accepted by the consumer.

A storage device 460 is also in communication with the processor 410, storing processor-executable process steps of an operating system 470 and of a Web browser 480. The process steps of the operating system 470, such as the Palm® operating system, are executed by the processor 410 to control basic operations of the consumer device 400. The process steps of the Web browser 480 may be executed by the processor 410 to provide communication between the consumer device 400 and a Web server executing within the controller 200 via the World Wide Web. Of course, depending on the communication media disposed between the consumer device 400 and the controller 200, other known processor-executable process steps or hardware may be needed for the consumer device 400 to communicate with the controller 200. For example, in a case that a telephone number offer pointer is included in a billing statement in association with a transaction, the consumer device 400 need only be a device capable of communicating over the telephone network.

Databases

The databases described in detail below are depicted in tabular form with sample entries in the accompanying figures. In this regard, and as will be understood by those skilled in the art, the schematic illustrations and accompanying descriptions of the databases presented herein are merely intended to demonstrate operable systems for associating and storing information which may be used in accordance with the present invention. A number of other data structures may be employed beside those suggested by the tables shown. Similarly, the illustrated entries of the databases represent sample information only; those skilled in that art will understand that the number and content of the entries can be different from those illustrated.

Consumer Account Database

FIG. 7 illustrates a tabular representation of a portion of the consumer account database 160 according to one embodiment of the present invention. The consumer account database 160 is used to store information regarding credit card accounts issued by the issuing bank. It should be noted that in a case that the issuing bank contracts with a third party to generate billing statements and/or to manage consumer accounts, the consumer account database 160 as shown in FIG. 7 may be located at and controlled by the third party.

Each record shown in the illustrated portion of the consumer account database 160 includes several fields, the fields specifying: i) a consumer identifier 161 used to identify a consumer with whom a record is associated; ii) a name 162 of the associated consumer; iii) an address 163 to which billing statements may be delivered and at which the consumer may be reached; iv) a credit card account number 164 identifying a credit card account associated with the consumer; v) an amount owed by the consumer 165 for transactions posted to the credit card account; vi) a minimum amount due 166 associated with the credit card account; vii) a due date 167 by which the associated minimum amount due 166 must be received by the issuing bank device 100; and viii) an amount owed by controller 168.

The consumer identifier 161 and the credit card account number 164 may be generated by the issuing bank device 100 upon creating an account for a consumer. In this regard, a request or an application to open a credit account with the issuing bank may be received by the issuing bank device 100, the application including a consumer name and address. Accordingly, the received name and address information is stored as a name 162 and an address 163, and a consumer identifier 161 and a credit card account number 164 are generated and stored in associated fields of a record as shown in FIG. 7. It should be noted that a credit card account number 164 may be used in place of a consumer identifier 161. However, in a case that a consumer has been issued more than one credit card account, it may be convenient to reference all the consumer's accounts using a single consumer identifier 161.

In a case that the name 162 and the address 163 are obtained through a written application form, the information may be entered into the consumer account database 160 by an employee operating the input device 125 of the issuing bank device 100. The associated consumer identifier 161 and credit card account number 164 are preferably generated by process steps stored in the data storage device 140 and executed by the processor 110 or may also be input via the input device 125. Of course, other methods for receiving consumer information and for generating associated account information may be used in practicing the present invention.

The amount owed by the consumer 165 reflects a current balance of an associated account. The amount owed by consumer 165 may reflect a total of all charges posted to the associated account for which the consumer has not yet paid the issuing bank. As described in detail below, the amount owed by consumer 165 may be less than the total of all charges for which the consumer has not yet paid in a case that the consumer has accepted an offer to reduce an amount owed according to the present invention. For example, in a case that unpaid charges associated with an account equal $238.76 but the consumer has accepted an offer to switch long distance services in exchange for $40.00, the amount owed by consumer 165 will reflect $198.76 ($238.76–$40.00).

The minimum amount due 166 and due date 167 associated with a record indicate, respectively, a minimum amount which is due to the issuing bank device 100 and a date by which the minimum amount is due. According to many types of credit card accounts, a consumer will be charged a late fee if the issuing bank device 100 does not receive the minimum amount due 166 by the due date 167. As will be described in detail below, the minimum amount due 166 and the due date 167 each may be modified based on acceptance of an offer by a consumer in accordance with the present invention. In one example, a minimum amount due 166 of $20.00 may be reduced to $15.00 in a case that a consumer accepts an offer to receive two free magazines. As previously described, such an offer may be presented as a statement offer in association with a transaction on a billing statement or may be reviewed by a consumer using an offer pointer associated with a transaction on a billing statement.

The amount owed by controller 168 indicates, in one embodiment, an amount previously owed by a consumer but now owed to the issuing bank device 100 by the controller 200. Using the example given with respect to the amount owed by consumer 165, the $40.00 offered to the consumer in exchange for an agreement to switch long distance services is subtracted from the amount owed by consumer 165 and added to an associated amount owed by controller 168.

Transaction Database

A tabular representation of a portion of the transaction database 170 is illustrated in FIG. 8. The transaction database 170 is used to record transaction information related to credit card accounts issued by the issuing bank. Each record of the transaction database 170 according to the illustrated embodiment includes fields specifying: i) a transaction identifier 171; ii) a credit card account number 172; iii) a transaction description 173; iv) a transaction date 174; v) an amount due 175; and vi) a merchant identifier 176.

As described above, the data stored in the transaction database 170 may be received by the issuing bank device 100 from a credit card clearinghouse, from another central collector and repository of credit card transaction information, directly from merchants executing transactions using credit cards issued by the issuing bank, directly from consumers holding credit card accounts with the issuing bank, from other sources, or from any combination of the above. In some embodiments, only transaction information relating to credit card accounts issued by the issuing bank device 100 is stored in the transaction database 170.

The transaction identifier 171 may be assigned to a set of information received by the issuing bank device 100 relating to one transaction. Accordingly, the transaction identifier 171 provides simple access to information associated with the transaction. The credit card account number 172 identifies the credit card account used in the transaction, and the transaction description 173 provides a description of a subject transaction. The description 173 may identify a purchased product and/or service to varying degrees of specificity. The transaction date 174 and the amount due 175 reflect a date on which the transaction occurred and a corresponding amount which was charged to the credit card account. Finally, the merchant identifier 176 is a code identifying a merchant from whom the product and/or service was purchased.

In one embodiment, a billing statement corresponding to a particular credit card account is generated by examining the transaction database 170 to identify each record in which the credit card account is identified in the credit card account number field 172 and which is associated with a transaction date 174 falling within a range of dates with which the billing statement is concerned. Transaction information of each identified record may then be used in any of the manners described above to generate a billing statement including offer pointers and/or statement offers.

Rules Database

FIG. 9 shows a tabular representation of a portion of the rules database 240 of the controller 200. The controller 200 may use the information stored in the rules database 240 to determine a statement offer, an offer pointer and/or an offer to associate with a transaction on a billing statement. The determination may, as described above, be based on information corresponding to the transaction. Therefore, utilization of the rules database 240 as described herein advantageously allows a consumer to review offers deemed appropriate to particular transactions. In a case that the issuing bank device 100 or another device is used to make such determinations, the rules database 240 may be stored in or otherwise accessible by that device.

The rules database 240 includes fields specifying: i) a rule identifier 241; ii) an amount owed range 242; iii) a transaction category 243; iv) a merchant 244; and v) alternative payment information 245. In the present embodiment, the information stored in the rules database 240 may be communicated to the controller 200 by any device in direct or indirect communication with the controller 200, such as the subsidizing merchant device 300 or the input device 215 of the controller 200.

The rule identifier 241 of a given record is a code identifying a rule which is the subject of the record. The amount owed range 242 of a record may be used to determine whether to associate alternative payment information 245 of the record with a transaction on a billing statement. Specifically, in a case that an amount charged to an account due to a transaction is within an amount owed range 242, alternative payment information 245 associated with the amount owed range 242 may be associated with the transaction on a billing statement. Similarly, if a transaction satisfies the transaction category 243 and the merchant 244 of a record in the rules database 240, the transaction may be associated on a billing statement with alternative payment information 245 associated with the record. It should be noted that, in some embodiments, alternative payment information 245 of a record may be associated with a transaction on a billing statement even if the amount owed, transaction category and/or merchant associated with the transaction do not comply exactly with respective values in the rules database 240.

It should be noted that the rules database 240 may store many other criteria based on which alternative payment information 245 is selected for association with a transaction on a billing statement. For example, the rules database 240 may include fields specifying a payment due date, characteristics or ratings of the consumer associated with the transaction, inventory levels of certain products, market economic indicators, subsidy payments paid by offer providers, or other characteristics. The rules database 240 may also include a field to specify types of transaction descriptions, such as current charges, previous charges, finance charges, total amount owed, minimum amount due, due date, etc. Using values such as these, alternative payment information 245 may be explicitly associated with particular types of transaction descriptions on a billing statement.

The alternative payment information 245 associated with a record may include an offer, an offer pointer and/or a statement offer. As described above, the alternative payment information 245 may be associated with a transaction on a billing statement if criteria associated with the alternative payment information 245 is satisfied by the transaction. As shown, alternative payment information 245 including an offer pointer may include a wildcard which is assigned a value prior to associating the offer pointer and the assigned value with a transaction on a billing statement. For example, the offer pointer may be a URL with a CGI extension "amountowed=[amountowed]". In this case, "[amountowed]" is substituted with an actual amount owed associated with a transaction prior to associating the URL and extension with the transaction on a billing statement. An offer pointer included in alternative payment information 245 may refer to a particular offer or may be used to access an offer which may change periodically due to various factors.

Alternative payment information 245 may also include an offer in the form of an expression of an agreement to perform an obligation along with a device such as a checkbox by which a consumer may indicate agreement. When associated with a transaction on a billing statement, such alternative payment information 245 comprises an offer to eliminate an amount owed associated with the transaction upon agreement to the obligation. In other embodiments, alternative payment information 245 may include an offer using language such as "BOL will pay the entire minimum amount due this month if you agree to sign up for one year of internet service" along with a checkbox for indicating agreement.

It should be noted that a particular transaction may satisfy the criteria of more than one rule in the rules database 240. In such a case, the alternative payment information 245 associated with each satisfied rule may be associated with the transaction on a billing statement, or some system of arbitration may be employed to select one or more of the alternative payment information 245. Such arbitration may be based on qualities of the associated consumer, of the offers referenced by the information 245, other factors or combinations of the foregoing.

Offer Database

A tabular representation of a portion of the offer database 250 is shown in FIG. 10. The offer database 250 stores information regarding offers presented to consumers in accordance with the present invention. The information stored in the offer database 250 may be received from one or more subsidizing merchant devices 300, from the input device 215 of the controller 200 or from another device. The records in the offer database 250 specify: i) an offer identifier 251 identifying an offer; ii) a subsidizing merchant identifier 252 identifying a merchant providing the offer; iii) a benefit 253 included in the offer; iv) an obligation 254 included in the offer and in exchange for which the associated benefit will be provided and v) offer rules 255 specifying various conditions or instructions relating to the offer. As described with respect to FIGS. 1 and 2, the benefit 253, the obligation 254 and the offer rules 255 may take many different forms in accordance with the present invention.

As an example of usage of the offer database 250, a consumer operates the consumer device 400 to accesses the controller 200 via a URL printed on a billing statement in association with a transaction. In a case that the URL references a "medium charge" Web page, the controller 200, through execution of the process steps by the processor 205 and based on the offer rules 255, identifies offer identifier 251 999333O and presents an offer offering the consumer $40.00 if the consumer switches long distance service to NCI within 30 days of accepting the offer.

In another example, a consumer may dial a telephone number printed on a billing statement in association with a transaction, and thereby access a VR system provided by the controller 200. Upon accessing the system, the consumer enters a code printed adjacent to the telephone number on the billing statement. The controller 200 decodes the data to determine that the transaction included a purchase at a department store. Accordingly, the controller 200 identifies the offer identifier 251 888445O and presents the consumer with a playback of an audio recording offering the consumer to pay an amount due associated with the transaction up to $50.00 if the consumer makes at least a $50.00 purchase at Max $6^{th}$ Avenue department store within 14 days of accepting the offer. It should be noted that the controller 200 may identify that the consumer has made a department store purchase in several other ways. In one envisioned embodiment, the telephone number which is associated with the transaction is associated only with transactions involving a department store purchase. Accordingly, the controller 200 assumes that all requests received through the telephone number are associated with transactions including a department store purchase. Alternatively, the consumer may select from a menu presented by the VR system to indicate that the transaction included a department store purchase.

A benefit 253 and an associated obligation 254 may also be used to associate a transaction with a statement offer. Specifically, based on the record associated with the offer identifier 251 777666O, a statement offer such as "I agree to make a minimum $50.00 purchase at Max $6^{th}$ Avenue within 14 days of accepting this offer" may be associated with a transaction associated with an amount owed of less than $50.00.

As described above with respect to the rules database 240, more than one offer of the offer database 250 may be presented to a consumer based on associated offer rules 255. For example, in a case that a consumer requests to review offers using an offer pointer which references a "medium charge" Web page, and a transaction associated with the offer pointer was a department store purchase, offers corresponding to offer identifiers 251 999333O and 777666O may be presented. Alternatively, only one of the offers may be presented based on an arbitration system such as that described above with respect to the rules database 240.

Central Consumer Database

FIG. 11 shows a tabular representation of a portion of the central consumer database 260 of the controller 200. The central consumer database 260 is used to store consumer-specific data which may be used to determine statement offers and offer pointers to associate with a transaction on a billing statement and/or offers to present to consumers. Each record of the central consumer database 260 specifies: i) a consumer identifier 261 identifying a consumer who is the subject of the record; ii) a name 262 of the consumer; iii) credit card account numbers 263 associated with the consumer; iv) an acceptance percentage 264 associated with the consumer; and v) a fraud flag 265.

The credit card account numbers 263 associated with a consumer in the central consumer database 260 may reflect credit card accounts maintained by the issuing bank device 100 or by other issuing bank devices operated by other issuing banks. Such a scenario may occur in a case where the controller 200 provides functionality according to the invention for several different issuing banks.

The acceptance percentage 264 reflects a percentage of offers which are accepted by the consumer who is the subject of the record, and the fraud flag 265 indicates whether the consumer poses some type of risk or unreliability. The acceptance percentage 264 may reflect a percentage of total offers presented to the consumer, as statement offers or using an offer pointer, which are accepted by the consumer, a number of accepted offers as a percentage of billing statements transmitted to the consumer, or some other percentage reflective of accepted offers.

During use, a consumer associated with a low acceptance percentage 264 may be presented with an offer pointer specific to consumers having a low acceptance percentage 264. Such an offer pointer may reference a Web page including offers which are more enticing than those accessed using an offer pointer presented to consumers having a higher acceptance percentage 264. Similarly, subsidizing merchants may specify, through offer rules 255 stored in the offer database 250, that certain offers should not be provided to consumers associated with a fraud flag 265 of "yes".

Of course, many other types of information may be stored in the central consumer database 260 based on which statement offers, offers and/or offer pointers are presented. For example, stored in association with each consumer identifier 261 may be a rating such as "gold", "silver", "bronze", and/or the consumer's credit rating.

Subsidizing Merchant Database

A tabular representation of a portion of the subsidizing merchant database 270 is shown in FIG. 12. The database 270 is used to manage accounts between the controller 200 and the subsidizing merchant device 300. For each subsidizing merchant reflected in the subsidizing merchant database 270, the database 270 includes: i) a subsidizing merchant identifier 271; ii) a subsidizing merchant name/description 272; iii) a remaining budget 273; and iv) an amount owed by merchant 274. The information stored in the subsidizing merchant database 270 may be received by the controller 200 from the subsidizing merchant device 300, from several subsidizing merchant devices, and/or from the input device 215 of the controller 200.

The subsidizing merchant identifier 271 uniquely identifies a particular merchant, and the subsidizing merchant name/description 272 provides the name of the merchant and a description of the products and/or services sold by the merchant. The remaining budget 273 reflects the availability of subsidy offers from the merchant. For example, a subsidizing merchant may provide offers to reduce an account balance by an amount owed of up to $50.00 if a consumer registers for one year of Internet access. Each time such an offer is accepted by a consumer, the amount of the reduction is added to the amount owed by merchant 274 associated with the merchant, such as the subsidizing merchant identified by the subsidizing merchant identifier 271 8484S. Accordingly, the associated remaining budget 273 is reduced by the amount of the reduction.

Offer Tracking Database

Figure 13:
FIG. 13 is a tabular representation of a portion of an offer tracking database according to one embodiment of the present invention.

FIG. 13 illustrates a tabular representation of a portion of the offer tracking database 280 stored in the storage device 230 of the controller 200. The offer tracking database 280 is used to track the status of offers accepted according to the present invention. As such, the offer tracking database 280 may be used to ensure that each party to a process according to the present invention is correctly compensated in response to consumer performance of an agreed-to obligation.

The offer tracking database 280 includes fields specifying: i) an accepted offer identifier 281 which identifies the accepted offer to which the record corresponds; ii) a subsidy amount 282 which is paid to the issuing bank device 100 to subsidize the reduction of an amount owed associated with a transaction on a billing statement; and iii) a status 283 specifying a status of various tasks required to settle and process an accepted offer according to the invention.

As an example of usage of the offer tracking database 280, the record identified by the accepted offer identifier 281 525252AO reflects an offer which was accepted by a consumer to provide $30.00 toward an amount owed on a credit card account associated with the consumer. As shown by the status field 283, the consumer has fulfilled an agreed-to obligation corresponding to the offer, the issuing bank device 100 was paid the $30.00 subsidy amount by the controller 200, and the controller 200 was paid, most likely by the entity which received the benefit of the fulfilled obligation, such as the subsidizing merchant device 300. Further details and examples of settlement according to embodiments of the present invention are set forth below.

Issuing Bank Database

FIG. 14 illustrates a tabular representation of a portion of the issuing bank database 290. The issuing bank database 290 is used to track an account between the controller 200 and issuing bank devices with which the controller 200 is in communication. Each record of the issuing bank database 290 includes: i) a bank identifier 291; ii) a bank name 292; and iii) an amount owed to bank 293.

As described above, the controller 200 may notify the issuing bank device 100 that a total amount owed on an account maintained by the issuing bank device 100 should be reduced in view of an accepted offer. In some embodiments, the controller 200 reimburses the issuing bank device 100 an amount roughly equal to the amount by which the total amount owed was reduced. However, instead of reimbursing the issuing bank device 100 each time a consumer accepts an offer, amounts owed to the issuing bank device 100 may be tracked in the issuing bank database 290 and paid periodically.

Consumer Database

Figure 15:
FIG. 15 is a tabular representation of a portion of a consumer database according to one aspect of the present invention.

Shown in FIG. 15 is a tabular representation of a portion of the consumer database 370 stored in the subsidizing merchant device 300 according to one embodiment. The subsidizing merchant device 300 may utilize the consumer database 370 in order to determine a particular subsidy offer to present to a consumer. The data stored in the consumer database 370 may be received from the input device 330 of the subsidizing merchant device 300 and/or from various merchant devices in communication with the subsidizing merchant device 300, with one or more of the various merchant devices being operated by different merchants.

Each record in the consumer database 370 specifies: i) a consumer identifier 371 identifying a unique consumer; ii) a name 372 of the consumer; iii) an address 373 of the consumer; iv) a consumer rating 374; and v) demographic information 375 corresponding to the consumer.

In some embodiments of the present invention, a consumer uses the consumer device 400 and an offer pointer printed on a billing statement in association with a transaction to request information from the controller 200. In response, the controller 200 requests an offer from the subsidizing merchant device 300 and transmits the consumer's identity. The subsidizing merchant device 300 then evaluates information corresponding to the consumer stored in the consumer database 370 and determines appropriate offers based on the information. The offers are transmitted to the controller 200 and are thereafter presented to and reviewed by the consumer. As described with respect to the central consumer database 260, many types of consumer information may be stored in the consumer database 370 and used to determine appropriate offers to provide. For example, the consumer rating 374 may take into account real or estimated profits made from the consumer, the frequency with which the consumer transacts with the merchant, the number of friends the consumer brings to the merchant, etc.

Subsidy Offer Database

FIG. 16 illustrates a tabular representation of a portion of the subsidy offer database 380 according to one embodiment of the present invention. The subsidy offer database 380 is used, in one embodiment, to store information regarding subsidy offers provided by a merchant operating the subsidizing merchant device 300, and to select and transmit appropriate subsidy offer information to the controller 200 upon receiving a request from the controller 200 to do so. The subsidy offer information may be input to the subsidy offer database 380 through the input device 330 of the subsidizing merchant device 300, or may be received from other devices.

Each record of the subsidy offer database includes: i) a subsidy offer identifier 382; ii) a benefit 384; iii) an obligation 386; and iv) subsidy offer rules 388. As shown in FIG. 16, the fields of the subsidy offer database 380 include information similar to that included in corresponding fields of the offer database 250. However, in the illustrated embodiment, each record reflects a subsidy offer provided by a same merchant.

Of course, the subsidy offer database 300 may store information regarding subsidy offers provided by several merchants. In this case, the stored subsidy offer information may be received from devices operated by the several merchants. Also in such a case, it may be beneficial to include a field in each record identifying the merchant providing the subsidy offer represented by the record.

Processes

Figure 17:
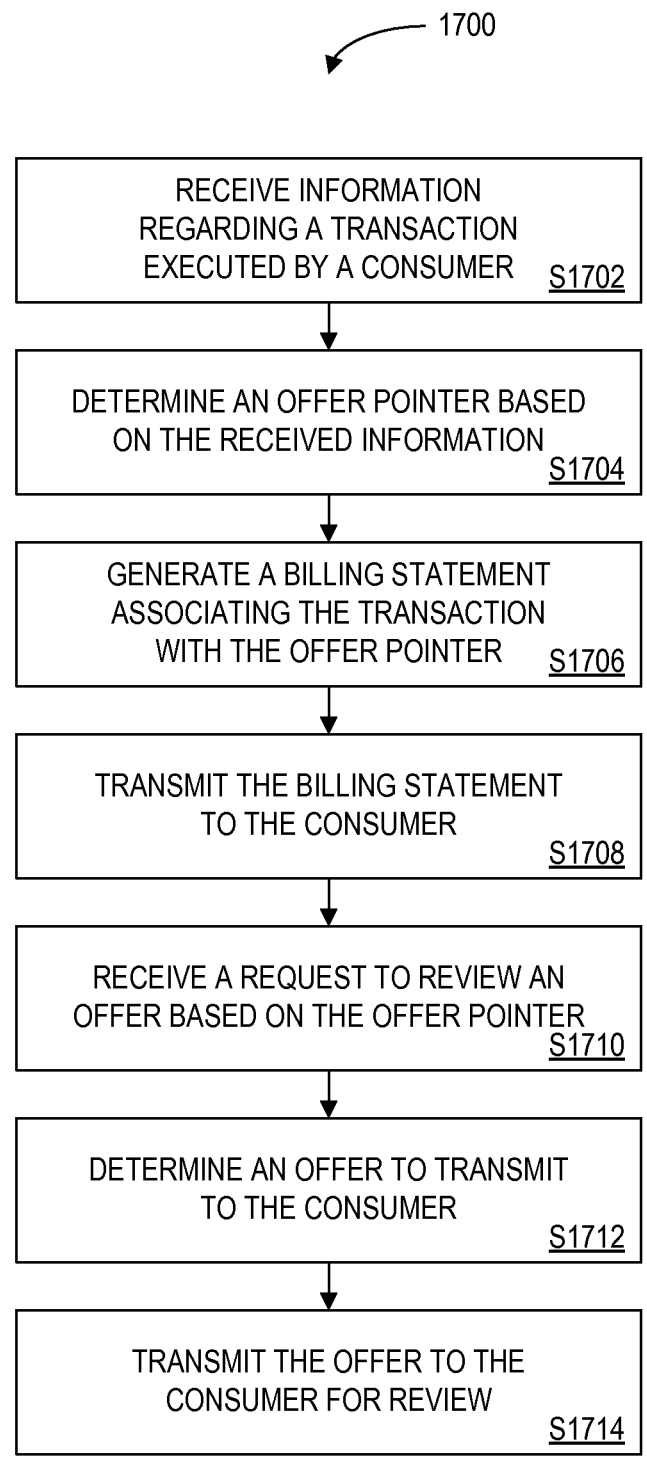
FIG. 17 is a flow diagram of processor-executable process steps to generate a billing statement according to one embodiment of the present invention.

FIG. 17 is a flow diagram of process steps 1700 according to one embodiment of the present invention. Briefly, the FIG. 17 process steps include steps to generate a billing statement including a description of a transaction and an offer pointer associated with the transaction, wherein the offer pointer includes information that may be used to review an offer. In a case that the controller 200 performs the process steps 1700, the process steps 1700 may be embodied in hardware within the controller 200, in processor-executable process steps stored on a computer-readable medium such as the data storage device 230 and executed by the processor 205, in processor-executable process steps encoded in an electronic signal received by the controller 200 and executed by the processor 205, or in any combination thereof. It should be noted that the process steps 1700 may be, wholly or in part, stored in and/or executed by elements of the issuing bank device 100, the subsidizing merchant device 300 or any another suitable device.

The process steps 1700 are described below in the context of a specific example according to one embodiment of the invention. In this example, a consumer executes a transaction to purchase a toothbrush at Jack's Dime Store for $1.10. The consumer executes the transaction by presenting a credit card issued by the issuing bank device 100 to the merchant. The merchant passes a magnetic strip located on the credit card through a credit authorization terminal to read an associated credit card account number therefrom. The terminal associates the account number (e.g. 5555 6666 7777 8888) with the cost of the product ($1.10), a description of the product (toothbrush), the identity of the merchant (Jack's Dime Store), the current date (e.g. Mar. 29, 2003), and a merchant identifier identifying the merchant (e.g. 7777M). This associated transaction information is transmitted to a credit card clearinghouse, from which it is routed to the issuing bank device 100 based on the account number. In this regard, the credit card clearinghouse maintains a database of credit card numbers and associated issuing banks. By matching the received account number to an entry in the database, the credit card clearinghouse determines to which issuing bank device 100 the transaction information should be transmitted. Once received by the issuing bank device 100, the transaction information is assigned a transaction identifier and is stored in association with the transaction identifier in the transaction database 170. As shown in FIG. 8, the transaction identifier 171 555555T identifies the transaction information of the present example.

In step S1702, the controller 200 receives the transaction information from the issuing bank device 100 through the communication port 210. Next, in step S1704, the controller 200 uses the rules database 240 to determine an offer pointer based on the transaction information. According to the rules database of FIG. 9, the received transaction information satisfies the amount owed range 242, the transaction category 243 and the merchant 244 associated with the rules identified by rule identifiers 241 555R and 666R. However, in this example, the alternative payment information 245 associated with the rule identifier 241 555R is determined as an offer pointer only if the received transaction information fails to satisfy the criteria of any other rule. Accordingly, the offer pointer determined in step S1704 is the alternative payment information 245 associated with the rule identifier 666R, or "http://www.erasecharges.com/amountowed=1.10".

A billing statement is generated in step S1706, the billing statement associating the executed transaction with the determined offer pointer. Billing statement 1 of FIG. 1 represents a billing statement generated in step S1706 according to the present example. The billing statement 1 is generated by creating an electronic document formatted as shown in FIG. 1 and by printing a hardcopy of the document using the printer 225. The billing statement 1 associates the transaction with the determined offer pointer by locating the determined offer pointer on a same line of the billing statement 1 as the transaction date 15, the description 20 and the amount owed 25 corresponding to the transaction. The hardcopy of the billing statement 1 is transmitted to the consumer in step S1708 by post, using the name 162 and the address 163 associated with the received credit card account number 164 in the consumer account database 160.

In step S1710, the controller 200 receives a request to review an offer based on the offer pointer. The request is received in the form of a request for a Web page corresponding to the offer pointer transmitted from the consumer device 400. More specifically, prior to step 1710, the consumer to whom the statement 1 was transmitted enters the offer pointer into a Web browser provided by the consumer device 400 through execution of the Web browser process steps 480. The Web browser then transmits a command to retrieve an associated Web page over the World Wide Web, from which the command is received by a corresponding Web server provided by the controller 200.

An offer is determined by the controller 200 in step S1712 using the offer database 250. More specifically, the offer rules 255 of each offer reflected in the database 250 are evaluated to determine which reflected offer should be presented to the consumer. As shown in FIG. 10, only the offer identified by the offer identifier 251 222111O is associated with rules that are satisfied by the present transaction. Accordingly, it is determined in step S1712 to transmit the offer identified by the offer identifier 251 222111O to the consumer.

The offer is transmitted to the consumer in step S1712. Specifically, a Web page including the offer is sent to the Web browser from which the request was received in step S1710. The Web page may include a statement such as "Your charge of $1.10 will be eliminated if you agree to receive two free issues of Big Top magazine", and selectable icons labeled "I Agree" and "I Don't Agree". Accordingly, if the consumer indicates agreement by selecting the "I Agree" icon, settlement proceeds according to one of the embodiments described above.

It should be noted that an offer may be determined prior to determination of an offer pointer, with the offer pointer then determined so as to provide a consumer with access to the determined offer. According to one embodiment, such an offer is determined based on the received transaction information prior to step S1704. Therefore, the offer then determined in step S1712 is the same as the offer determined prior to step S1704.

By virtue of the foregoing process steps, it is likely that the offer eventually reviewed will be thoroughly considered. Moreover, the complexity of the offer and the number of offers are not strictly limited by space constraints imposed by the billing statement. The offer may also be more personalized, reflective of real-time conditions such as inventory or product demand, and/or tailored to the characteristics or needs of the consumer, the seller, or a third party. Consequently, the offer may be more likely to be accepted than an offer presented using conventional methods.

Figure 18:
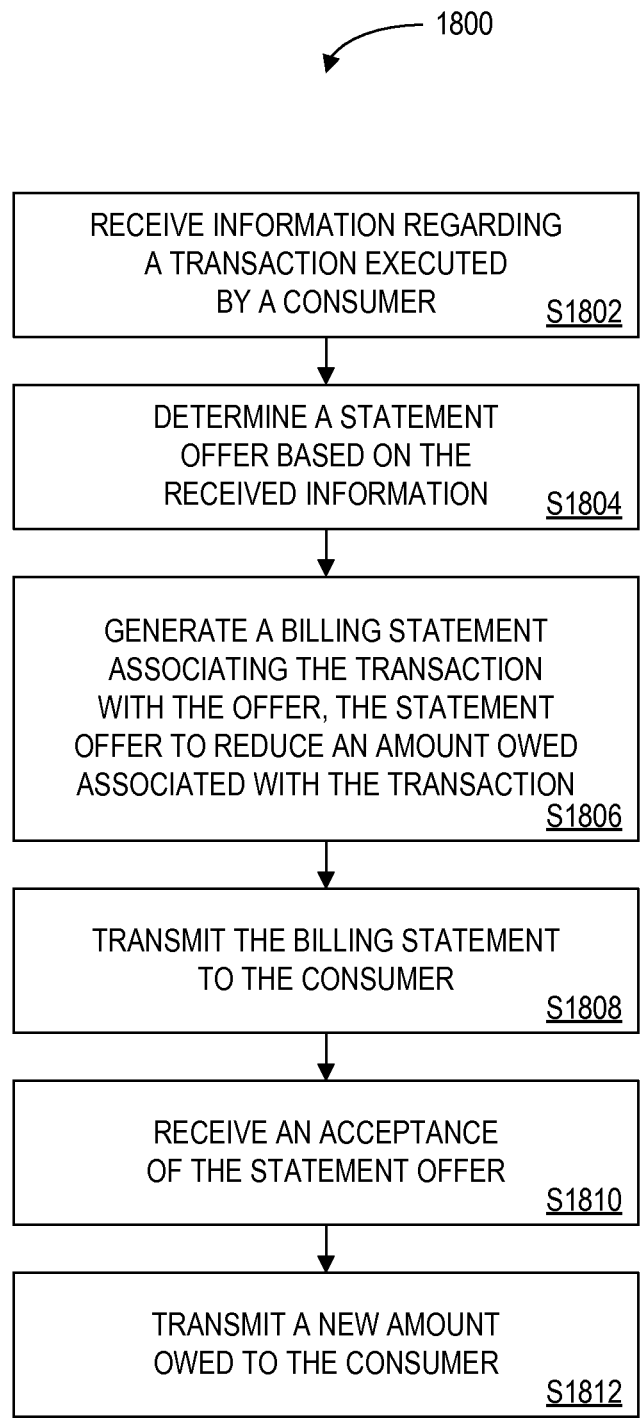
FIG. 18 is a flow diagram of processor-executable process steps to generate a billing statement according to one embodiment of the present invention.

FIG. 18 is a flow diagram of process steps 1800 according to one embodiment of the present invention. Briefly, the FIG. 18 process steps include steps to generate a billing statement including a description of a transaction and an offer associated with the transaction, wherein the offer is an offer to reduce an amount owed associated with the transaction. In a case that the controller 200 performs the process steps 1800, the process steps 1800 may be embodied in hardware within the controller 200, in processor-executable process steps stored on a computer-readable medium such as the data storage device 230 and executed by the processor 205, in processor-executable process steps encoded in an electronic signal received by the controller 200 and executed by the processor 205, or in any combination thereof. It should be noted that the process steps 1700 may be, wholly or in part, stored in and/or executed by elements of the issuing bank device 100, the subsidizing merchant device 300 or another suitable device.

Initially, flow begins at step S1802, wherein the controller 200 receives from the issuing bank device 100 information regarding a transaction executed by a consumer using a credit card account. In this example, the information includes a minimum due ($30.00) corresponding to the credit card account. The minimum due is considered a description of a transaction, with the transaction including all previous transactions based on which the minimum due is calculated.

A statement offer is determined in step S1804 based on the received information. The statement offer is determined using the rules database 240, particularly by determining alternative payment information 245 associated with an amount owed range 242, a transaction category 243 and a merchant 244 which correspond to the received information. Accordingly, the alternative payment information 245 "I agree to register for 1 year of BOL Internet access" is determined as a statement offer in step S1804 based on the received minimum due of $30.00.

Next, in step S1806, a billing statement is generated which associates the transaction described by the minimum due with the determined statement offer. FIG. 1 illustrates such an association. As described with respect to FIG. 1, the statement offer as shown on the billing statement 1 is an implied offer to eliminate the minimum due in exchange for a consumer's agreement to perform the described obligation. According to this example, the statement offer offers to pay the $30.00 minimum due if the consumer agrees to register for 1 year of Internet access with BOL.

The generated billing statement is transmitted to the consumer in step S1808 in response to a request to view a billing statement received from the consumer device 400. In more detail, the consumer operates a Web browser provided by the consumer device 400 to review a billing statement, and the controller 200 provides a Web server which transmits a generated credit card billing statement to the consumer over the World Wide Web so that the consumer is able to review an electronic version of his billing statement using the Web browser.

The consumer then operates the consumer device 400 to place a check mark in the checkbox displayed beside the statement offer, thereby indicating acceptance of the statement offer. The acceptance is then transmitted over the World Wide Web, from which it is received by the controller 200 in step S1810. Next, the controller 200 calculates a new total amount owed associated with the credit card account. The new total amount owed is $30.00 less than the total amount owed shown in FIG. 1, or $671.35. The new amount owed is transmitted to the consumer in step S1812 using a Web page generated by the controller 200.

Additional Embodiments

The following are several examples of additional embodiments of the present invention. These examples do not constitute all possible embodiments, and those skilled in the art will understand that the present invention is amenable to many other embodiments. Those skilled in the art will understand how to make any changes, if necessary, to the above-described system to accommodate these and other embodiments and applications.

In one embodiment, a consumer may choose a transaction on a billing statement to associate with an offer pointer or an offer. Such an embodiment allows a consumer to choose a transaction to which a benefit of an accepted offer will be applied.

In determining offers to present to consumers, the controller 200 or subsidizing merchant device 300 may calculate a value of the consumer to the subsidizing merchant. The value calculation may be based upon any information about the consumer, and may be based on comparisons to other consumers with similar characteristics.

An offer may also be determined based on credit history of a consumer. For example, a consumer who owes a large amount or who has demonstrated difficulty in paying off prior balances may be given offers whose obligation components are more difficult to meet than those of a typical offer. In this regard, a consumer who frequently revolves credit balances may be considered to have difficulty in paying off balances.

The controller 200, or some other party, may maintain a list of offers previously accepted by a consumer. Using the list, the controller 200 may prevent a consumer from accepting offers which conflict with the intent of previously-accepted offers. For example, a consumer who has previously accepted an offer requiring him to switch to a long distance service provider may be prevented from accepting an offer requiring him to switch to another long distance service provider.

In some embodiments, the consumer accepts and performs an obligation benefiting the controller 200 (or the issuing bank device 100) rather than any subsidizing merchant. Once the consumer has fulfilled the obligation, the controller 200 may later resell resulting work product to another party, such as a merchant. For example, in a case that the obligation requires the consumer to answer survey questions, the controller may sell the answers to the survey questions to various merchants.

In one embodiment of settlement according to the invention, the issuing bank device 100 charges the controller 200 for a total amount owed under a credit card account. In turn, the controller 200 charges the consumer for any amounts owed that are not eliminated through the acceptance of offers according to the invention.

An offer pointer may reference a Web page having a search feature. The consumer may use the feature to enter some criteria for narrowing the types of offers presented to him. For example, the consumer might search for offers whose obligation components involve visiting resorts.

Although the present invention has been described with respect to particular embodiments, those skilled in the art will note that various substitutions and modifications may be made to those embodiments without departing from the spirit and scope of the present invention.

What is claimed is:

1. A method comprising:
    receiving, electronically by a controller, information about a transaction for a purchase of an item or service between a consumer and a merchant;
    determining, by the controller, an amount owed by the consumer for the purchase;
    determining, by the controller, an offer that provides the consumer a benefit of reducing an amount owed by the consumer in exchange for accepting or completing conditions of the offer based, at least in part, on the amount owed by the consumer for the purchase; and
    transmitting, electronically by the controller, the offer for the consumer to a consumer device.

2. The method of claim 1, wherein the offer is based, at least in part, on history data of the consumer.

3. The method of claim 2, wherein the history data comprises purchase history.

4. The method of claim 1, wherein the offer is based, at least in part, on geographic information of the consumer.

5. The method of claim 1, wherein the transmitting is by email.

6. The method of claim 1, wherein the offer is viewable on the consumer device.

7. The method of claim 1, wherein the consumer device is a cellular phone.

8. The method of claim 1, wherein the benefit is provided by a party different from the merchant.

9. The method of claim 1, further comprising receiving an indication of whether the consumer has accepted the offer, wherein the indication is received from the consumer via the consumer device.

10. The method of claim 1, wherein the offer is further based on a type of transaction category and a type of merchant.

11. The method of claim 1, wherein the amount owed is to a third party different from the merchant.

12. A system comprising:
   a memory storing information about offers for and to consumers; and
   a processor operable for:
      receiving, by a controller, information about a transaction for a purchase of an item or service between a consumer and a merchant;
      determining, by the controller, an amount owed by the consumer for the purchase;
      determining, by the controller, an offer that provides the consumer a benefit of reducing an amount owed by the consumer in exchange for accepting or completing conditions of the offer based, at least in part, on the amount owed by the consumer for the purchase; and
      transmitting, by the controller, the offer to a consumer device.

13. The system of claim 12, wherein the offer is based, at least in part, on history data of the consumer.

14. The system of claim 13, wherein the history data comprises purchase history.

15. The system of claim 12, wherein the offer is based, at least in part, on geographic information of the consumer.

16. The system of claim 12, wherein the transmitting is by email.

17. The system of claim 12, wherein the offer is viewable on the consumer device.

18. The system of claim 12, wherein the consumer device is a cellular phone.

19. The system of claim 12, wherein the benefit is provided by a party different from the merchant.

20. The system of claim 12, wherein the processor is further operable for receiving an indication of whether the consumer has accepted the offer, wherein the indication is received from the consumer via the consumer device.

21. The system of claim 12, wherein the offer is further based on a type of transaction category and a type of merchant.

22. The system of claim 12, wherein the amount owed is to a third party different from the merchant.

* * * * *